US007221829B2

(12) United States Patent
Oono et al.

(10) Patent No.: US 7,221,829 B2
(45) Date of Patent: May 22, 2007

(54) SUBSTRATE ASSEMBLY FOR SUPPORTING OPTICAL COMPONENT AND METHOD OF PRODUCING THE SAME

(75) Inventors: Takeshi Oono, Aichi (JP); Toshikatsu Takada, Aichi (JP); Mitsugu Onoda, Nagoya (JP); Toshifumi Kojima, Aichi (JP); Toshikazu Horio, Aichi (JP); Ayako Kawamura, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 212 days.

(21) Appl. No.: 10/782,865

(22) Filed: Feb. 23, 2004

(65) Prior Publication Data

US 2004/0184737 A1 Sep. 23, 2004

(30) Foreign Application Priority Data

| Feb. 24, 2003 | (JP) | 2003-045469 |
| Jun. 27, 2003 | (JP) | 2003-185881 |
| Sep. 5, 2003 | (JP) | 2003-313626 |
| Nov. 13, 2003 | (JP) | 2003-383390 |

(51) Int. Cl.
*G02B 6/36* (2006.01)

(52) U.S. Cl. ............................ 385/52; 385/88; 385/93
(58) Field of Classification Search .................. 385/31, 385/33, 34, 35, 52, 88–94
See application file for complete search history.

(56) References Cited

U.S. PATENT DOCUMENTS 6,741,778 B1 * 5/2004 Chan et al. .................... 385/52

6,960,031 B2 * 11/2005 McFarland et al. ............ 385/89
2003/0007717 A1 * 1/2003 Chiappetta et al. ........... 385/14
2003/0068153 A1 4/2003 Suzuki

FOREIGN PATENT DOCUMENTS

| JP | 8-250542 | 9/1996 |
| JP | 2002-236228 | 8/2002 |
| JP | 2003-107283 | 4/2003 |

OTHER PUBLICATIONS

T. Ohta, et al.; "Two Dimensional Array MT Connector"; Fujikura Technical Review No. 97; Oct. 1999; pp. 22-27

* cited by examiner

*Primary Examiner*—Kevin S. Wood
(74) *Attorney, Agent, or Firm*—Sughrue Mion, PLLC

(57) ABSTRACT

A substrate assembly for supporting an optical component includes a substrate having a front surface and a first recess, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical component. A method of producing such a substrate assembly is also provided.

16 Claims, 16 Drawing Sheets

SUBSTRATE ASSEMBLY FOR SUPPORTING OPTICAL COMPONENT AND METHOD OF PRODUCING THE SAME

BACKGROUND OF THE INVENTION

The present invention relates to a substrate assembly for supporting an optical component and a method of producing the same.

In recent years, with the development of information communication techniques represented by the Internet and a great improvement in the processing speed of information processing systems, the needs to send and receive high volume data such as images are increasing. In order to send and receive such high volume data freely through information communication facilities, an information transmission speed of 10 Gbps or larger is desirable. Optical communication techniques are greatly expected as the techniques to realize a high-speed telecommunication environment. In the meantime, it is desired to transmit signals at high speed through relatively short signal transmission paths such as connecting paths between circuit boards in systems, connecting paths between semiconductor chips of circuit boards and connecting paths in semiconductor chips. To this end, it is considered ideal to shift from transmission using metal cables and wirings, which has generally been used, to optical transmission using optical fibers and waveguides.

Circuit boards mounting thereon optical devices and adapted to make optical communication between the optical device and an optical fiber or optical waveguide have been proposed as disclosed in Unexamined Japanese Patent Publications Nos. 2002-236228 and 8-250542. Disclosed in the Unexamined Japanese Patent publications is such a technique that an external substrate mounting thereon an optical device can be positioned in place on a circuit board by a self-alignment effect attained at the time solder bumps for connection between the external substrate and the circuit board are reflowed. Furthermore, as a unit to connect optical fibers each other, a device called an optical fiber connector has been proposed as disclosed in Fujikura Technical Review No. 97, October, 1999.

SUMMARY OF THE INVENTION

However, in the techniques described in the above-described Unexamined Japanese Patent Publications, alignment or positioning (optical axis alignment) of the external substrate mounting thereon the optical device with respect to the circuit board is merely attained by solder reflow processing. For this reason, alignment accuracy is insufficient, and a shift or movement of the optical axes of the optical device relative to the optical axes of the optical waveguide tends to be caused, thus likely causing an optical transmission loss. Therefore, such techniques are considered incapable of sufficiently meeting a demand for high speed and high density optical communication expected in future. Moreover, in the case where the circuit board is a resin substrate, heat radiation or dissipation of the optical device and an operation circuit thereof is deteriorated. Consequently, a drift is likely to be generated in the emission wavelength. Therefore, stable operating characteristics cannot be obtained in this case.

In the meantime, in case the circuit board is a ceramic circuit board, the problem of heat dissipation is solved to some extent, but there is possibly caused an increase in cost since the ceramic circuit-board is poor in the machinability or workability.

Further, it can be considered to use the optical fiber connector described in the Fujikura Technical Review No. 97 for connecting the circuit board to the optical fibers, but the optical fiber connector is poor in radiation or removal of heat because it is a resin product. Therefore, heat cannot be removed efficiently from the optical device and the active circuits, so that a drift is likely to be generated in the emission wavelength as well.

It is accordingly an object of the present invention to provide a substrate assembly for supporting an optical component that is free from the above-described problems, i.e., which is excellent in heat dissipation or radiation and also in productivity.

It is a further object of the present invention to provide a fabrication method of such a substrate assembly.

To achieve the above objects, there is provided according to an aspect of the present invention a substrate assembly for supporting an optical component having at least one of an optical transmission function, a light condensing function, and a light reflecting function, the substrate assembly comprising a substrate having a front surface and a first recess having an open end at least at the front surface, a second recess formed portion placed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical component. In the meantime, "the optical component" is a member independent from the substrate assembly and an object to be aligned with the substrate assembly, so that it is not an essential element of the present invention. The optical component has at least one of an optical transmission function, a light condensing function, and a light reflecting function.

Therefore, according to the invention, by fitting the alignment guide member protruding from the substrate side in the alignment hole of the optical component, the optical axis of the optical device can be aligned actively and accurately. Therefore, a substrate assembly for supporting an optical component, that is small in optical transmission loss and sufficiently ready for high speed and high density optical communication.

As the substrate of the substrate assembly for supporting the optical component, can be used, for example, a resin substrate, ceramic substrate and glass substrate. However, a ceramic substrate is most preferable. In case a ceramic substrate that has a higher thermal conductivity as compared with a resin substrate is used, the heat generated can be removed with efficiency. Preferable examples are substrates made of alumina, aluminium nitride, silicon nitride, boron nitride, beryllia, mullits, low-temperature fired glass ceramics, and glass ceramics. Among all of them, it is particularly preferable to select substrates made of alumina or aluminium nitride.

Further, as preferable resin substrates can be enumerated substrates made of, for example, EP (epoxy) resin, PI (polyimide) resin, BT (bismaleimlde triazin) resin, PPE (polyphenylene ether), etc. Further, substrates made of composite materials of the resins described above and glass fiber (woven glass fiber or unwoven glass fiber) or organic fiber such as polyamide fiber. As preferable metallic substrates can be enumerated, for example, a copper substrate, substrate made of a copper alloy, substrate made of a single metal other than copper and a substrate made of an alloy other than a copper alloy.

Preferably, such a substrate is a circuit board having an insulating layer and a conductor layer (metal wiring layer). The conductor layer may be formed on the substrate surface or inside the substrate. In order to provide interlayer connection between the conductor layers, it will do to form via hole conductors inside the substrate. In the meantime, for example, the conductor layers and the via hole conductors are formed by printing or filling a conductive metal paste made of gold (Au), silver (Ag), copper (Cu), platinum (Pt), tungsten (W), and molybdenum (Mo). The conductor layers are adapted to transmit electrical signals therethrough. In the meantime, in addition to such a circuit board can be used, for example, a build-up circuit board having on a substrate a build-up layer formed from alternately laminated insulating layers and conductor layers.

The substrate has the front surface and the first recess having an open end at least at the front surface. Therefore, it will do that the first recess is a non-through hole having an open end only at the front surface (i.e., a recess having only one open end) or a through hole having an open end also at the surface opposite to the front surface (i.e., a hole having two open ends). The size and shape of the first recess are not defined particularly, as long as the first recess can be formed with the second recess formed portion which will be described later and can support the alignment guide member.

The substrate assembly may be equipped with an optical device. However, in the present invention, an optical device is an optional element. One or more optical devices are mounted on the front surface of the substrate. As the mounting methods, for example, techniques such as wire bonding and flip chip bonding and techniques with anisotropic conductive materials can be used. As optical devices having the light emitting part (that is, light emitting devices), for example, a Light Emitting Diode (LED), a semiconductor Laser Diodes (LD), and a Vertical Cavity Surface Emitting Laser (VCSEL) can be named. These light emitting devices have a function that converts inputted electrical signals to optical signals and then emits the optical signals from the light emitting part toward a predetermined area of the optical waveguide or the optical fiber connector. In the meantime, as optical devices having the light receiving part (that is, light receiving devices), for example, a pin Photo Diode (pin PD), and an avalanche photodiode (APD) can be named, These light receiving devices have a function that receives optical signals having been emitted from a predetermined area of the optical waveguide or the optical fiber connector in the light receiving part and converts the entered optical signals to electrical signals for output. Therefore, the light emitting part of the light emitting device and the light receiving part of the light receiving device are optically connected to the optical waveguide or the optical fiber connector in the state that the optical axes are aligned with each other. In the meantime, the optical device may have both of the light emitting part and the light receiving part. As materials suitable for use in the optical device can be enumerated, for example, St, Ge, InGaAs, GaAsP, and GaAlAs. These optical devices (particularly the light emitting devices) are operated by active circuits. For example, the optical device and the active circuits are electrically connected to each other through the conductor layers (metal interconnect layers) formed in the substrate.

An optical component to be aligned with the substrate assembly of the present invention has at least one of the optical transmission function, the light condensing function, and the light reflecting function. More specific examples of the optical component having the optical transmission function are optical waveguides and optical fibers. In the meantime, the base material supporting the optical waveguide can also be regarded as the optical component having the optical transmission function. The optical component formed of the optical fiber and the optical fiber connector supporting the optical fiber can also be regarded as the optical component having the optical transmission function. For example, the optical component having the light condensing function is lens components typified by a microlens array. For example, the optical component having the light reflecting function is an optical path switching component. Furthermore, the optical fiber connector formed with an optical path switching part can be said that it is the optical component having the light reflecting function. The optical waveguide formed with the optical path switching part can be said that it is the optical component having the optical transmission function and the light reflecting function. In the meantime, the substrate assembly of the present invention may support only one optical component or can support two or more optical components.

The optical waveguide is a plate-like or film-like member having a core to be an optical path through which optical signals propagate and a cladding surrounding the core. For example, there are organic optical waveguides made of polymer materials, and inorganic optical waveguides made of silica glass and compound semiconductors. As the polymer material, photosensitive resins, thermosetting resins, and thermoplastic resins can be selected. More specifically, polyimide resins such as fluoridated polyimide, epoxy resins, UV cure epoxy resins, acryl resins such as PMMA (polymethyl methacrylate), deuterated PMMA and deuterated and fluorinated PMMA, and polyolefin resins are preferable.

The optical fiber connector is intrinsically a unit to connect optical fibers each other, but it is used as a unit to connect the optical fiber to the substrate here. In the meantime, the optical fiber connector may be a single-core optical fiber connector or multicore optical fiber connector. Moreover, in addition to its intrinsic function to intend to connect to the substrate, for example, the optical fiber connector may have an additional function that reflects light and switches optical paths.

The second recess formed portion is positioned inside the first recess and has the second recess smaller in diameter than the first recess and having an open end at least at the front surface. The second recess may be a non-through or blind hole having an open end only at the front surface (that is, only one open end is provided) or a through hole having an additional open end at the surface opposite side to the front surface (that is, two open ends are provided). The size and share of the second recess are not defined particularly, as long as the second recess can support the alignment guide member which will be described later. Furthermore, the center line of the first recess is not necessarily aligned with the center line of the second recess.

The second recess formed portion is made of a material having a workability or machinability better than the main material (resin, ceramic, glass or metal) forming the substrate. Herein, the material having a better "workability" or "machinability" is intended to indicate the material whose processing such as drilling, punching, etching and laser processing can be done more easily. For example, it can be said that the material that is lower in hardness than the main material forming the substrate has a better workability or machinability. If such a material having a better workability or machinability is used, a high precision perforating or piercing can be attained with east and at low cost.

In case the main material forming the substrate is a ceramic material such as alumina, the second recess formed portion may be made of machinable ceramic having a machinability better than the ceramic material forming the substrate. The "machinable ceramic" is a ceramic material that can be out with machines. Preferred examples of the machinable ceramics are mica ceramic (artifical mica crystal grown in glass), composite mica ceramics in which glass is used as a matrix and fluorine-gold-mica-zirconia is uniformized, and ceramic such as porous aluminium nitride in which a resin is immersed. In this manner, in case of a substrate assembly in which both of the substrate and second recess formed portion are made of ceramic materials, the heat can be removed from the substrate assembly more efficiently. In the meantime, ceramic is an inorganic material and has a small thermal expansion coefficient. Accordingly, the difference in the thermal expansion coefficient between the substrate and the second recess formed portion is quite small, so that a crack or cracks are hard to be caused at the interface between the substrate and the second recess formed portion (i.e., at the joint between the inner surface of the first recess and the outer surface of the second recess formed portion), thus making it possible to attain a reliable joint between the substrate and the second recess formed portion. This enables the substrate to support the alignment guide member with an increased strength. Further, the alignment guide member can be supported by the second recess formed portion so as to have a high positional accuracy.

Further, the second recess formed portion may be made of an inorganic material such as glass, silicon and solder or conductive paste containing an inorganic material as a major component. Such materials have an advantage of a relatively small thermal expansion coefficient.

Further, the second recess formed portion may be a resin layer made of an organic material such as resin. In comparison with the inorganic materials described as above, resinous materials have a better machinability so that highly accurate or perforating can be attained with ease and at low cost.

The second recess is preferably a precision processed or machined hole. This is because the alignment guide member to be the reference in the optical axis alignment can be supported at a right position when it is the precision processed or machined hole.

Resin for forming the resin layer that constitute the second recess formed portion is not limited to particular one. For example, thermosetting resins, thermoplastic resins, and photosensitive resins can be used. More specific examples of the thermosetting resins are epoxy resins, polyimide resins, fluororesins, bismaleimide resins, polyphenylene resins, phenol resins, and polyolefin resins. In this case, thermosetting resins with small cure shrinkage are preferably selected. More specific examples of the thermoplastic resins are polysulfone (PSF), polyphenylether (PPE), poly (phenylene sulfone) (PPS), poly (ethersulfone) (PES), and polyphenylene sulfide (PPES).

The resin layer may contain fillers other than resins. As these fillers, organic fillers made of resins, and inorganic fillers made of ceramics, metals, and glass can be named. In this case, in view of easy processing, the organic fillers are relatively advantageous for selection. In view of thermal expansion coefficient matching with the ceramic substrate, the inorganic fillers are relatively advantageous for selection. More specifically; in the case of the resin layer containing the inorganic filler, the thermal expansion coefficient is matched with that of the ceramic substrate. Consequently, it is hard to generate cracks in the interface to the ceramic substrate (that is, the interface to the inner wall surface of the first recess) to improve the reliability in that place. Therefore, the strength of the alignment guide member for support is improved. Furthermore, it is hard to reduce the alignment accuracy of the alignment guide member even when the resin layer supports the alignment guide member.

Further, the resin layer preferably contains the inorganic filler with thermal conductivity higher than that of the resin configuring the resin layer. In this case, the thermal conductivity of the resin layer is improved and therefore the total heat dissipation of the substrate assembly is improved. Further, heat can be released to the ceramic substrate side through the resin layer even though heat is generated in the resin layer during machining of the second recess.

As a ceramic material suitable for the inorganic filler, for example, alumina, aluminium nitride, boron nitride, silica, silicon nitride, silicon carbide, magnesia, beryllia, and titania can be enumerated. Furthermore, as metal materials suitable for the inorganic filler, for example, gold (Au), silver (Ag), copper (Cu), platinum (Pt), tungsten (W), and molybdenum (Mo) can be enumerated.

The alignment guide member is supported by the second recess formed portion (substrate) by being fitted in the second recess. In this supported state, a part of the alignment guide member is extended from the front surface of the ceramic substrate. Here, the shape of the alignment guide member is not defined particularly, but a pin-shaped product (guide pin) is preferable, for example. Metals that are hard to some extent are preferable for the material. Further, the diameter of the alignment guide member (particularly, the diameter of the portion protruding from the front surface of the ceramic substrate) needs to be the same diameter as that of the alignment hole so as to fit in the alignment hole of the optical waveguide or the optical fiber connector.

The number of the alignment guide member is not limited, but multiple alignment guide members are more preferable than a single alignment guide member in view of the alignment accuracy and fixing strength.

According to a further aspect of the present invention, there is provided a fabrication method of a substrate assembly for supporting an optical component having at least one of an optical transmission function, a light condensing function, and a light reflecting function, the substrate assembly including a substrate having a front surface and a first recess having an open end at least at the front surface, a second recess formed portion placed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical component, the method comprising a first perforating step of forming the first recess in the substrate by machining, a second recess formed portion forming step of forming the second recess formed portion in the first recess, a second perforating step of forming the second recess in the second recess formed portion by machining after the second recess formed portion forming step, and a guide member fitting step of fitting the alignment guide member in the second recess.

According to a further aspect of the present invention, there is provided a fabrication method of a substrate assembly for supporting an optical component having at least one of an optical transmission function, a light condensing function, and a light reflecting function, the substrate assembly including a ceramic substrate having a front surface and a first recess having an open end at least at a side corresponding to the front surface, a second recess formed portion placed in the first recess and having a second recess smaller in diameter than the first recess and having an open end at least at the front surface, the second recess formed portion being made of a ceramic material having a machinability better than an inorganic material forming the substrate, and an alignment guide member fitted in the second recess and having a protruded portion protruding from the front surface of the ceramic substrate and fittingly engageable in an alignment hole of the optical component, the method comprising a first perforating step of forming the first recess in an unsintered ceramic product by machining, a firing step of firing the unsintered ceramic product to form the ceramic substrate, a second recess formed portion forming step of forming the second recess formed portion in the first recess, a second perforating step of forming the second recess in the resin layer by machining after the resin layer forming step, and a guide member fitting step of fitting the alignment guide member in the second recess. In the meantime, "the optical component" is a member independent from the substrate assembly and an object to be aligned with the substrate assembly, so that it is not an essential element of the present invention.

Therefore, according to the invention, the substrate assembly structured as described above can be fabricated assuredly and at low cost.

Hereinafter, the fabrication method of the optical component mounted substrate assembly will be described.

The optical component is preferably formed with the above-described alignment hole by being processed by an alignment hole forming step. In this connection, well-known perforating or machining techniques can be used in the alignment hole forming step. Specific examples are drilling, punching, etching, and laser beam machining. However, from a point of view of cost, machining such as drilling and punching are preferable. Furthermore, more preferably, perforating conducted here is precision drilling by using a precision drill. This is because the optical axis alignment can be conducted highly accurately when the alignment hole is formed by these methods. Moreover, the alignment hole may be a through hole opening through the front and rear surfaces of the optical component or a blind hole having an open end only at the rear surface. Further, the diameter of the alignment hole can be processed by finish machining according to the necessity for thereby making fine adjustment thereof after the alignment hole forming step.

In the first perforating step, the first recess is formed in the substrate by machining. In this connection, it is preferable to form by machining the first recess in an unsintered ceramic product which is to be formed into a ceramic substrate by firing or sintering. The reason why to form the recess in the unsintered ceramic material is as follows. That is, since the ceramic material has a property to harden when fully fired, machining becomes difficult and machining costs are increased. On the other hand, forming a hole in the unsintered ceramic material that is not so hard can be made relatively easily at low cost. In this connection, a well-known technique can be used as a perforating method carried out in the first perforating step. More specific examples of such perforating methods are drilling, punching, and laser beam machining. However, from a point of view of cost, machining such as drilling and punching is preferable and particularly punching is more preferable.

In the first perforating step, preferably, the inner diameter of the first recess after the firing step is set to be larger than the inner diameter of the second recess and the outer diameter of the alignment guide member. This is because the first recess needs to be formed larger in diameter in consideration of shrinkage of ceramic caused after the firing step, which causes the first recess to become smaller in diameter and be displaced out of position.

In case an unsintered ceramic body is used in the first perforating step, the firing step is then performed so that the unsintered ceramic body is heated at high temperature thereby sintered and formed into the ceramic substrate. At this point of time, the ceramic is hardened. The temperature and time for sintering are determined according to the selected kind of ceramic material.

In the subsequent second recess formed portion forming step, the second recess formed potion is formed in the first recess. Technique for forming the second recess formed portion in the first recess is not limited to particular one. For example, a method is preferable that fills an uncured material in the first recess and then cures the material. According to the method, there is not formed any space between the first recess and the second recess formed portion, and the adhesion of the second recess formed portion to the inner wall surface of the first recess is improved. Therefore, the second recess formed portion can be held reliably in the first recess, and therefore the alignment guide member can be held reliably in the substrate.

For example, when a thermosetting resin is selected as a material for forming the second recess formed portion, it is heated after filled in the first recess, and then the resin material is cured. When a photosensitive resin is selected, ultraviolet rays are irradiated thereto, and then the resin material is cured. For example, the resin material can be filled by techniques such as printing. Furthermore, it is acceptable to use uncured resin materials containing a variety of fillers as the resin material, and to use uncured resin materials containing inorganic fillers with thermal conductivity higher than that of the resin configuring the resin layer. The reason why has already been described above. Further, a technique that does not require filling of an uncured resin material, for example, a technique of fitting a completely or partially cured resin boy in the first recess can be employed.

Further, the second recess formed portion may be formed by using some of the above-described inorganic materials. For example, in case machinable ceramic is used, it is preferable to employ such a process of first filling a machinable ceramic slurry in the first recess and thereafter firing the slurry thereby forming the second recess formed portion. In this connection, it will suffice to fill the machinable ceramic slurry in the first recess of the unsintered ceramic body that is later formed into the ceramic substrate and thereafter heat and sinter the slurry and the unsintered ceramic body together so that the slurry and the unsintered ceramic body are sintered simultaneously. Further, in case glass, silicon or solder is used, it is preferable to prepare a block of a selected material and fit the block in the first recess.

At this state of process, a polishing step of polishing at least the front surface of the substrate to remove an excessive resin layer projected from the first recess or the resin layer adhered to substrate surface. By this step, the front surface of the substrate can be flattened. Thus, the optical device can be mounted in parallel to the front surface of the substrate in the later step. This is preferable to enhance the accuracy of optical axis alignment. That is, this is because the optical axes are hard to align each other when the optical device is inclined, not in parallel to the front surface of the substrate.

In the subsequent second perforating step, the second recess is formed in the second recess formed portion by machining after the second recess formed portion forming step. A known technique can be used for the second perforating step but a precision perforating process is desirable. This is because the alignment guide member to be the reference in the optical axis alignment can be held at the desired, right position when the second recess is formed by the precision perforating process. Specific example of the precision perforating process is drilling, punching, and laser beam machining, but drilling with a precision drill is most preferable in consideration of cost. In the meantime, it will do to conduct the polishing step after the second perforating step. When this is the case, burrs generated in the second perforating step can be removed assuredly.

Further, the diameter of the second recess can be subjected to finish machining thereby making fine adjustment thereof according to the necessity after the second perforating step. In the meantime, in case the second recess formed portion is formed by the resin layer, the resin layer in a semi-cured state may be subjected to the second perforating step, then cured completely and thereafter subjected to the above-described finish machining.

In the meantime, instead of the technique of performing the second perforating step after the second recess formed portion forming step, a technique of performing the second recess formed portion forming step and the second perforating step at the same time may be employed. More specifically, a spacer member is first disposed in the first recess. A preferred example of the spacer member is a mold with a pin, for instance. The pin has a shape corresponding to the shape of the alignment guide member. In this case, the mold and the substrate have to be aligned with each other highly accurately. In this state, an uncured resin material is filled and cured, and then the spacer member is removed. According to the technique, the second recess formed portion having the second recess can be formed considerably at low cost.

Then, after the alignment guide member is fitted in the second recess to be supported thereby in the guide member fitting step, the alignment guide member is fitted in the alignment hole of the optical component. That is, when the optical axes of the optical are aligned with each other by such an alignment step, a desired optical component equipped substrate assembly that supports thereon another optical component can be obtained.

Further, instead of the technique of sequentially performing the second recess formed portion forming step, the second perforating step and the guide member fitting step, a technique of performing the second recess formed portion forming step and the guide member fitting step at the same time may be employed. More specifically, the alignment guide member is first held in a state that a part thereof is inserted into the first recess in this case, it is desired that the alignment guide member is positioned highly accurately. More desirably, a plurality of the alignment guide members are held temporarily fixedly by using a guide member holding jig or the like. Subsequently, in this state, an uncured resin material is filled and cured in the first recess. As a result, the second recess formed portion having the second recess is formed, and at the same time, the alignment guide member can be mounted in the second recess to be supported thereby. The guide member holding jig is removed after the resin is cured. This technique is also advantageous for the reason of low cost.

According to a further aspect of the present invention, there is provided a fabrication method of a substrate assembly for supporting an optical component having at least one of an optical transmission function, a light condensing function, and a light reflecting function, the substrate assembly including a substrate having a front surface and a first recess having an open end at least at the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical component, the method comprising a perforating step of forming the first recess in the substrate by machining, and a second recess formed portion forming and a guide member mounting step of holding the alignment guide member so that a portion of the alignment guide member is disposed within the first recess, filling an uncured material in the first recess and curing the material thereby forming the second recess formed portion having the second recess and mounting the alignment guide member in the second recess. By this, the substrate assembly for supporting the optical component can be produced at low cost. In the meantime, the substrate that is subjected to machining for forming the first recess is preferably an unsintered ceramic body.

DESCRIPTION OF THE PREFERRED EMBODIMENTS

[First Embodiment]

Hereinafter, an optical waveguide equipped optical device mounted substrate assembly (substrate assembly for supporting an optical component equipped with another optical component) 10 according to a first embodiment of the present invention will be described in detail with reference to FIG. 1 to 13.

Figure 1:
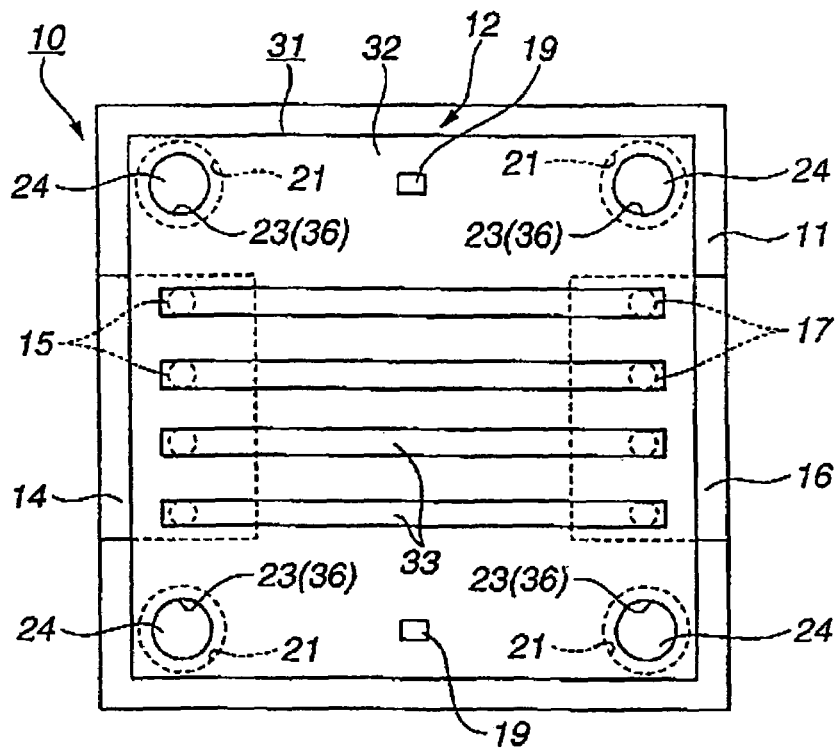
FIG. 1 is a schematic plan view of an optical waveguide equipped optical device mounted substrate assembly according to a first embodiment of the present invention.
Figure 2:
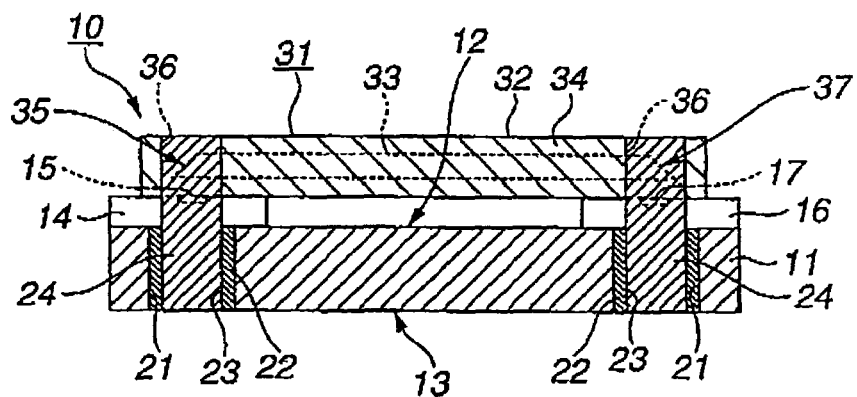
FIG. 2 is a schematic cross-sectional view of the optical device mounted substrate assembly.
Figure 3:
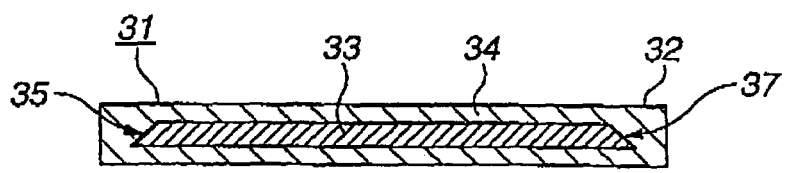
FIG. 3 is a schematic cross-sectional view of an optical waveguide in the fabrication process of the optical device mounted substrate assembly.

As shown in FIGS. 1 and 2, a ceramic substrate 11 configuring the optical device mounted substrate assembly 10 of the embodiment is a nearly rectangular plate member having a top surface 12 (front surface) and an under surface 13. This ceramic substrate 11 is a so-called multilayer circuit board having the top surface 12 (front surface), the under surface 13, and metal interconnect layers, not shown. The ceramic substrate 11 also has via hole conductors (omitted in the drawing), and the metal interconnect layers in different layers are in interlayer connection through the via hole conductors.

In FIG. 2, a VCSEL 14 (optical device), which is one kind of optical device (light emitting device), is mounted on the left end of the top surface 12 of the ceramic substrate 11 as the emission surface is faced upward. The VCSEL 14 has a plurality (here, four) of light emitting parts 15 arranged in a row in the emission surface. Thus, the light emitting parts 15 emit a predetermined wavelength of laser beams in the direction orthogonal to the top surface 12 of the ceramic substrate 11 (that is, toward the top of FIG. 2). On the other hand in FIG. 2, a photodiode 16, which is one kind of optical device (light receiving device), is mounted on the right end of the top surface 12 of the ceramic substrate 11 as the light receiving surface is faced upward. The photodiode 16 has a plurality (here, four) of light receiving parts 17 arranged in a row in the light receiving surface. Therefore, the light receiving parts 17 are configured to easily receive laser beams traveling from the top to the bottom of FIG. 2.

Moreover, the photodiode 16 and the VCSEL 14 are joined to a metal interconnect layer on the top surface 12 of the ceramic substrate 11. Particularly, the VCSEL 14 is electrically connected to an active circuit IC mounted on the top surface 12 of the ceramic substrate 11, not shown, through the metal interconnect layer.

As shown in FIGS. 1 and 2, first through holes 21 are disposed as first recesses at a plurality of places (four places here) in the ceramic substrate 11. The first through holes 21 are circular in the same cross sections, and opened in the top surface 12 (front surface) and the under surface 13 of the ceramic substrate 11. In the embodiment, the diameter of the first through hole 21 is formed to be about 1.0 to 2.0 mm. Furthermore, in the embodiment, two of the four first through holes 21 are disposed close to the VCSEL 14, and the rest are disposed close to the photodiode 16. A pair of the first through holes 21 disposed close to the VCSEL 14 is disposed at positions sandwiching the row of the light emitting parts 15 from both ends on almost the same straight line as the row of the light emitting parts 15. A pair of the first through holes 21 disposed close to the photodiode 16 is disposed at positions sandwiching the row of the light receiving parts 17 from both ends on almost the same straight line as the row of the light receiving parts 17.

A resin layer (second recess formed portion) 22 is provided inside the first through holes 21, and second through holes (second recesses) 23 are disposed at almost the center part of the resin layer 22. The second through holes 23 are circular in the same cross sections, and are opened in the top surface 12 (front surface) and the under surface 13 of the ceramic substrate 11. In the embodiment, the diameter of the second through hole 23 is smaller than that of the first through holes 21 and formed to be about 0.7 mm. Inside four second through holes 23, a guide pin 24 (alignment guide member) made of stainless steel in a circular cross section is fit as one end thereof is extended from the top surface 12 (front surface). More specifically, guide pin CNF125A-21, defined by JIS C 5981 (the diameter is 0.699 mm) is used in the embodiment.

As shown in FIGS. 1 and 2, an optical waveguide 31 (optical component) in a nearly rectangular film and in a size smaller than the ceramic substrate 11 is disposed over the top surface 12 (front surface) of the ceramic substrate 11. A base material 32 configuring the optical waveguide 31 has cores 33 and a cladding 34 surrounding them from above and below. Substantially, the cores 33 are optical paths through which optical signals propagate. In the embodiment, the cores 33 and the cladding 34 are formed of transparent polymer materials with different refractive indexes, more specifically, PMMA (polymethyl methacrylate) with different refractive indexes. The cores 33 to be the optical paths are four the same as the numbers of the light emitting parts 15 and the light receiving parts 17, and are formed to extend straight in parallel with each other. An inclined plane having an angle of 45° in the longitudinal direction of the core 33 is formed on both ends of the cores 33, and a thin film made of a metal that fully reflects light is deposited on the inclined planes. Therefore, the both ends of each of the cores 33 have optical path switching mirrors 35 and 37 for reflecting light at an angle of 90°. Circular alignment holes 36 are penetrated through at four corners of the optical waveguide 31. The alignment holes 36 are formed to have a diameter of about 0.7 mm matching with the size of the guide pins 24. Then, the guide pins 24 extended from the ceramic substrate 11 are fitted in the alignment holes 36 (optical component side alignment recesses) of the optical waveguide 31. Consequently, the optical waveguide 31 is fixed on the top surface 12 (front surface) of the ceramic substrate 11 as it is aligned. Here, more specifically, 'being aligned' is a state that each of the optical path switching mirrors 35 on the left end in FIG. 2 is right above each of the light emitting parts 15 and the optical axes of each of the cores 33 and each of the light emitting parts 15 are aligned with each other and a state that each of the optical path switching mirrors 37 on the right end in FIG. 2 is right above each of the light receiving parts 17 and the optical axes of each of the cores 33 and each of the light receiving parts 17 are aligned with each other. In the meantime, in the embodiment, the ceramic substrate 11 and the optical waveguide 31 are fixed to each other only in the relationship between the alignment holes 36 and the guide pins 24.

The general operations of the optical waveguide equipped optical device mounted substrate assembly 10 thus configured will be described briefly.

The VCSEL 14 and the photodiode 16 are in operable states by power supply through the metal interconnect layers of the ceramic substrate 11. When electrical signals are outputted from the active circuit IC on the ceramic substrate 11 to the VCSEL 14, the VCSEL 14 converts the inputted electrical signals to optical signals (laser beams) and then emits the optical signals from the light emitting parts 15 toward the optical path switching mirrors 35 at the left ends of the cores 33. The optical signals having been emitted from the light emitting parts 15 enter from the under surface of the optical waveguide 31 to the optical path switching mirrors 35 of the cores 33. The optical signals having entered the optical path switching mirrors 35 change the traveling direction there at an angle of 90°. On this account, the optical signals propagate through the inside of the cores 33 in the longitudinal direction thereof. Then, the optical signals having reached the right end of the cores 33 enter the optical path switching mirrors 37 formed on the right end of the optical waveguide 31. The optical signals having entered the optical path switching mirrors 37 change the traveling direction there at an angle of 90°. On this account, the optical signals go out of the under surface of the optical waveguide 31, and enter the light receiving parts 17 of the photodiode 16. The photodiode 16 converts the received optical signals to electrical signals, and outputs the converted electrical signals to another IC (omitted in the drawing) on the ceramic substrate 11.

Next, a fabrication method of the substrate assembly 10 for mounting the optical device equipped with the optical waveguide 31 will be described with reference to FIGS. 3 to 13.

Figure 4:
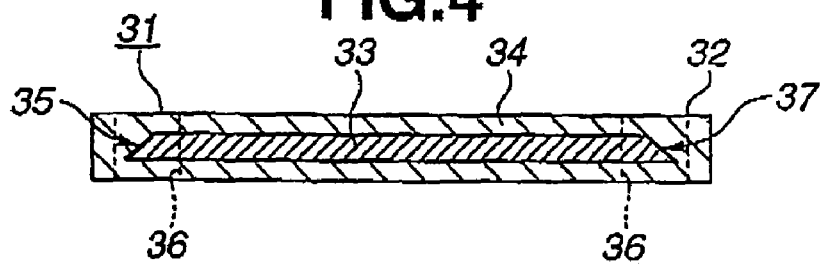
FIG. 4 is a schematic cross-sectional view illustrating a state that alignment holes are formed in the optical waveguide in the fabrication process of the optical device mounted substrate assembly.

First, the optical waveguide 31 is fabricated by previously publicly-known techniques (see FIG. 3), and it undergoes precision drilling to form the alignment holes 36 at four corners (see FIG. 4).

Figure 5:
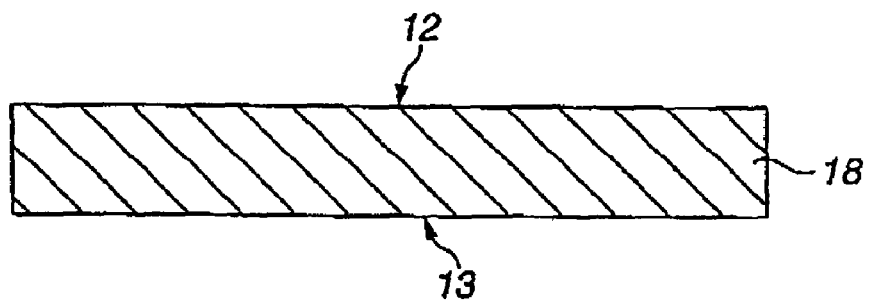
FIG. 5 is a schematic cross-sectional view of a green sheet layered product in the fabrication process of the optical device mounted substrate assembly.

Furthermore, the ceramic substrate 11 is fabricated in accordance with the following procedures. Alumina powder, an organic binder, a solvent, and a plasticizer are uniformly mixed and kneaded to form row material slurry, the row material slurry is used to shape a sheet by a doctor blade apparatus, and a green sheet in a predetermined thickness is formed. Predetermined portions of the green sheet are punched, and a metal paste for forming via hole conductors is filled in the holes formed. Moreover, a metal paste is printed on the surface of the green sheet to form a printed layer to be metal interconnect layers later. Then, a plurality of the green sheets is laminated and pressed into one piece, and a green sheet layered product 18 shown in FIG. 5 is formed. In the green sheet layered product 18 shown in FIG. 5, the metal interconnect layers and the via hole conductors are not shown for omission.

Figure 6:
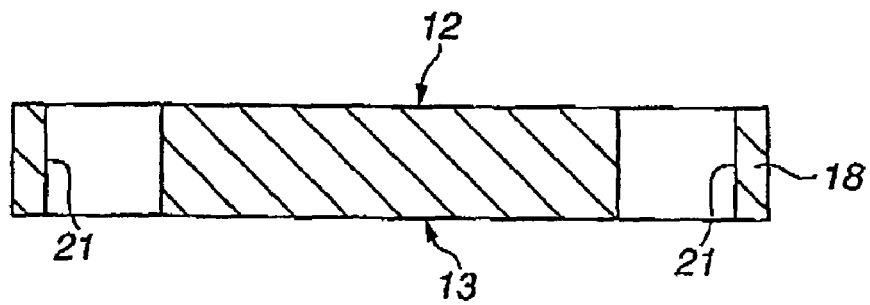
FIG. 6 is a schematic cross-sectional view illustrating a state that first through holes are formed in the green sheet layered product in the fabrication process of the optical device mounted substrate assembly.
Figure 7:
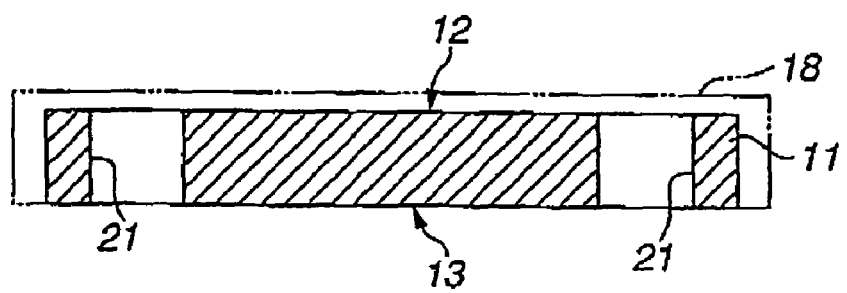
FIG. 7 is a schematic cross-sectional view illustrating a state that the green sheet layered product is fired to form a ceramic substrate in the fabrication process of the optical device mounted substrate assembly.

Subsequently, the green sheet layered product 18 is punched to form the first through holes 21 (first recesses) (a first perforating step, see FIG. 6). Since it is unsintered at this stage, holes can be formed relatively easily at low cost. The first perforating step is performed so that the inner diameter of the first through hole 21 (first recess) after a firing step is greater than the inner diameter (about 0.7 mm) of the second through hole 23 (the second recess and the substrate side alignment recess) and the diameter (about 0.7 mm) of the guide pin 24. More specifically, the first through holes 21 is formed so as to be about 1.2 to 2.4 mm in diameter. This is because the first through holes 21 (first recesses) need to form greater in the consideration that ceramics are shrunk after the firing step and the first through holes 21 (first recesses) become smaller in diameter and shifted in alignment.

Then, after a drying step and a degreasing step are conducted in accordance with well-known techniques, the firing step is conducted at temperatures that alumina can be sintered. Accordingly, the green sheet layered product 18 (unsintered ceramic product) is fired to form the ceramic substrate 11. At this point of time, the ceramic is hardened and shrunk (see FIG. 7).

In a subsequent resin layer forming step (second recess formed portion forming step), the resin layer 22 is formed in the first through holes 21 (first recesses) as below. First, 5 parts by weight of a curing agent (2P4MZ-CN made by Shikoku Corp.), 200 parts by weight of a silica filler (TSS-6 made by Tatsumori) treated with a silane coupling agent (KBM-403 made by made by Shin-Etsu Chemical Co., Ldt.), and an anti-foaming agent (BERSNOL S-4 made by SAN NOPCO LIMITED) are mixed to 80 parts by weight of bisphenol F epoxy resin (Epikote 807 made by JER Co., Ltd.), and 20 parts by weight of cresol novorac epoxy resin (Epikote 152 made by JER Co., Ltd.). The mixture is kneaded with triple rolls to form a resin material for forming the resin layer 22. That is, an uncured resin material containing an inorganic filler in a thermosetting resin is used in the embodiment.

Subsequently, the ceramic substrate 11 is set in a printing apparatus, and a predetermined metal mask (omitted in the drawing) is placed and contacted to the top surface 12. In this metal mask, openings are formed beforehand at places corresponding to the first through holes 21. The resin material is printed through the metal mask like this, and the resin material is fully filled inside each of the first through holes 21 with no space. After that, the printed ceramic substrate 11 is removed from the printing apparatus, it is heated at a temperature of 120° C. for one hour to cure the resin layer 22 formed by filling the resin material to some extent (it is partially cured) (see FIG. 8). Here, the reason why the resin layer 22 is not fully cured is that boring or other machining conducted in a second perforating step can be attained with ease.

Figure 9:
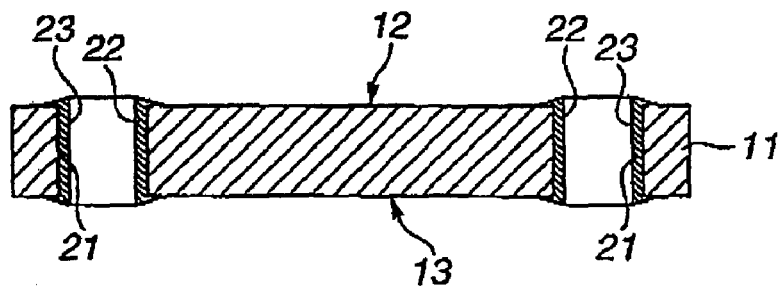
FIG. 9 is a schematic cross-sectional view illustrating a state that second through holes are formed in the resin layer in the fabrication process of the optical device mounted substrate assembly.

In the subsequent second perforating step, precision drilling with a precision drill is conducted to form the second through holes 23 (the second recesses and the substrate side alignment recesses) in the resin layer 22 (see FIG. 9). According to this machining, the second through holes 23 can be formed which can support the guide pins 24 to be the reference in the optical axis alignment at desired right positions.

Figure 10:
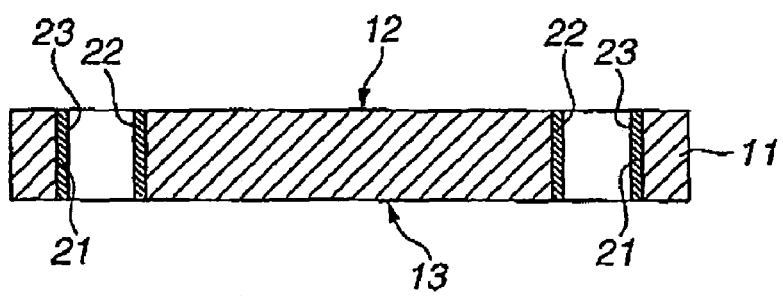
FIG. 10 is a schematic cross-sectional view illustrating a state that the surfaces of the ceramic substrate are polished in the fabrication process of the optical device mounted substrate assembly.

Then, the ceramic substrate 11 is set in a surface polishing apparatus to polish the top surface 12 and the under surface 13 to remove the excessive resin layer 22 extended from the openings of the first through holes 21 and the resin layer 22 attached to the substrate surface (see FIG. 10). In the meantime, this polishing step allows dips and bumps on the top surface 12 (front surface) of the ceramic substrate 11 to be eliminated and planarized.

After that, a full curing step in which the ceramic substrate 11 is heated at a temperature of 150° C. for five hours is conducted to fully cure the resin layer 22. Furthermore, known finish machining is conducted for fine adjustment of the second through holes 23 thereby adjusting the diameter of the second through hole 23 to 0.700 mm. More specifically, the accuracy required for machining at this time is ±0.001 mm.

Figure 11:
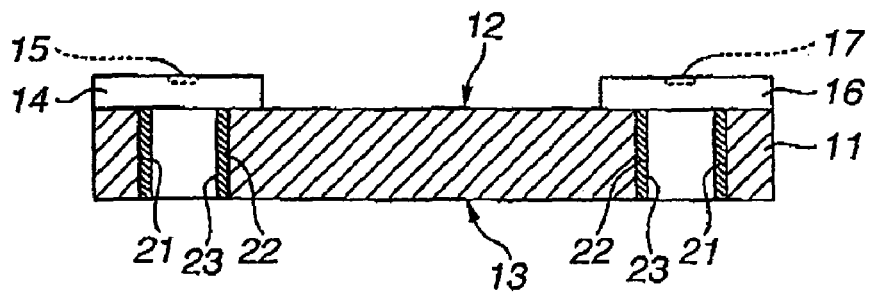
FIG. 11 is a schematic cross-sectional view illustrating a state that a VCSEL and a photodiode are mounted on the ceramic substrate in the fabrication process of the optical device mounted substrate assembly.

Subsequently, the VCSEL 14 and the photodiode 16 are mounted on the planarized top surface 12 of the ceramic substrate 11 through an anisotropic conductive material, not shown (see FIG. 11). Consequently, a part of the metal interconnect layer on the top surface 12 of the ceramic substrate 11 is electrically connected to connecting terminals of the VCSEL 14 and the photodiode 16. In the meantime, since the top surface 12 is a flat surface with no dips and bumps at this time, the VCSEL 14 and the photodiode 16 are in parallel to the top surface 12. In the embodiment, the optical device mounting step is conducted after finish machining and before a guide member fitting step. On this account, there is a merit that the VCSEL 14 and the photodiode 16 already mounted are not exposed to heat, vibrations, and dust, which are likely to be generated by drilling. Moreover, since the guide pins 24 are not erected yet near places where the optical devices are mounted, the VCSEL 14 and the photodiode 16 can be mounted relatively easily.

Figure 12:
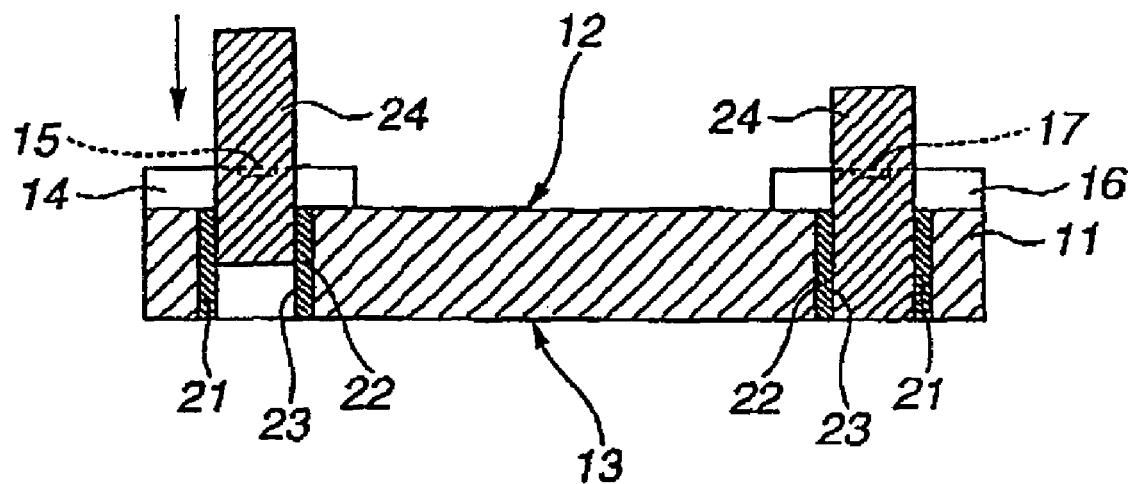
FIG. 12 is a schematic cross-sectional view illustrating a state that guide pins are fitted in the second through holes in the fabrication process of the optical device mounted substrate assembly.
Figure 13:
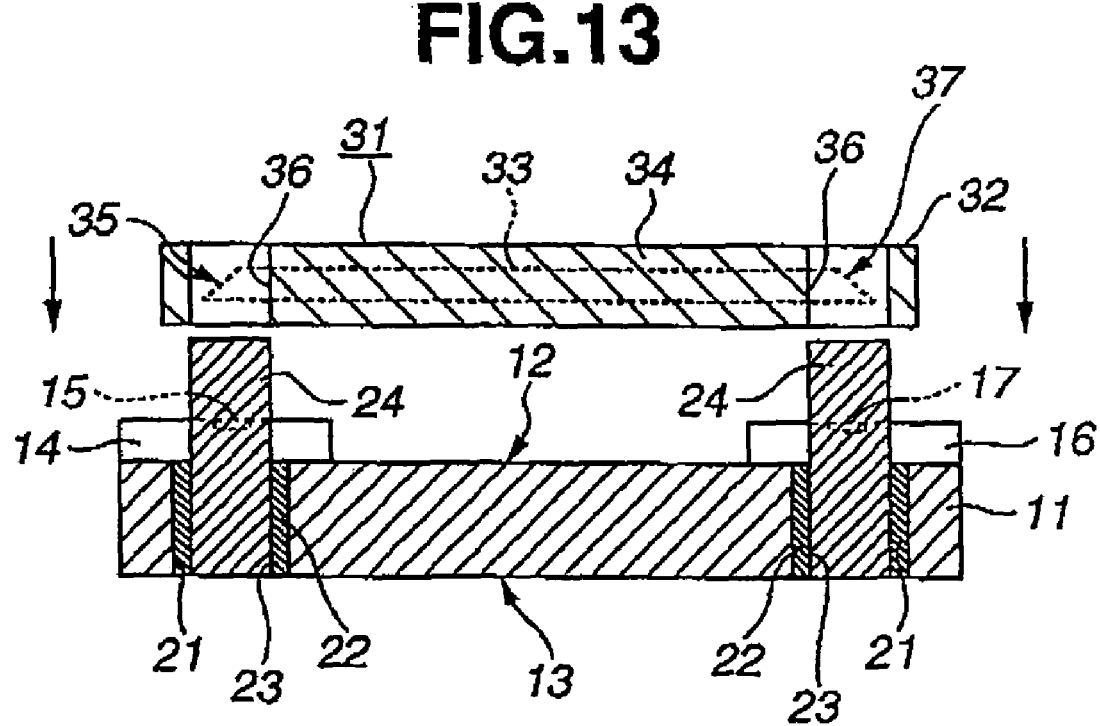
FIG. 13 is a schematic cross-sectional view illustrating a state that the optical waveguide is fixed as the ceramic substrate is aligned with the optical waveguide in the fabrication process of the optical device mounted substrate assembly.

In the subsequent guide member fitting step, the guide pins 24 are pressed and fitted in the second through holes 23 (the second recesses and the substrate side alignment recesses) with a jig for exclusive use (see FIG. 12).

In a subsequent alignment step, each of the guide pins 24 of the ceramic substrate 11 is fitted in each of the alignment holes 36 of the optical waveguide 31. Accordingly, the optical waveguide 31 is fixed to the ceramic substrate 11 as the optical axis alignment of the optical waveguide 31 with the VCSEL 14 and the optical ax-is alignment of the optical waveguide 31 with the photodiode 16 are conducted at the same time. As described above, the optical device with the optical waveguide mounted substrate assembly 10 of the embodiment is completed.

Therefore, the embodiment can obtain the following advantages.

(1) The embodiment is configured such that by fitting engagement of the guide pins 24 with the alignment holes 36, the optical axis alignment can be attained while allowing the ceramic substrate 11 and the optical waveguide 31 to be fixed to each other. Thus, the optical axes are aligned more positively and highly accurately than the traditional passive optical axis alignment that relies only on the self-alignment effect in reflow. Therefore, the optical device mounted substrate assembly 10 is small in optical transmission loss and sufficiently ready for high speed and high density optical communication. Furthermore, since the ceramic substrate 11 with thermal conductivity higher than that of the resin substrate is used, the heat generated from the VCSEL 14 and the active circuit IC is dissipated efficiently. Accordingly, the optical device mounted substrate assembly 10 excellent in stable operations and reliability can be realized in which a drift in the emission wavelength caused by a deterioration of heat dissipation can also be avoided.

(2) According to the fabrication method of the embodiment, the optical device mounted substrate assembly 10 with the configuration described above can be fabricated reliably at low cost.

[Second Embodiment]

Next, an optical waveguide equipped optical device mounted substrate assembly (substrate assembly for supporting an optical component equipped with another optical component) 10 according to a second embodiment of the present invention will be described. The embodiment is different from the first embodiment only in that the composition of a resin layer 22 is varied from that of the first embodiment.

In the resin layer forming step, 5 parts by weight of a curing agent (2P4MZ-CN made by Shikoku Corp.), 600 parts by weight of a copper filler (SRF-Cu-10 made by Nippon Atomized Metal Powders Corporation), an antifoaming agent (BERENOL S-4 made by SAN NOPCO LIMITED), and a thickening agent. (RY200 made by Nippon Aerosil Co., Ltd.) are first mixed to 100 parts by weight of an epoxy resin (Epikote 828 made by JER Co., Ltd.). The mixture is kneaded with triple rolls to form a resin material for forming the resin layer 22. That is, an uncured resin material containing an inorganic filler of high thermal conductivity in a thermosetting resin is used in the embodiment. Then, the resin material like this is filled in the first through holes 21 by printing, it is heated and cured, and steps after the second perforating step are sequentially conducted.

Therefore, the configuration of the embodiment can exert the same advantages as those of the first embodiment. In addition to this, the resin layer 22 contains the filler made of copper having thermal conductivity higher than that of epoxy resins. On this account, the thermal conductivity of the resin layer 22 is enhanced, and the total heat dissipation of the optical device mounted substrate assembly 10 is improved. Furthermore, the heat generated from the resin layer 22 in forming the second through holes 23 is efficiently released to the ceramic substrate 11 side through the resin layer 22. Thus, the possibility to reduce the processing accuracy of the resin layer 22 due to the effect of heat is eliminated, and the guide pins 24 can be supported in high alignment accuracy.

[Third Embodiment]

Figure 14:
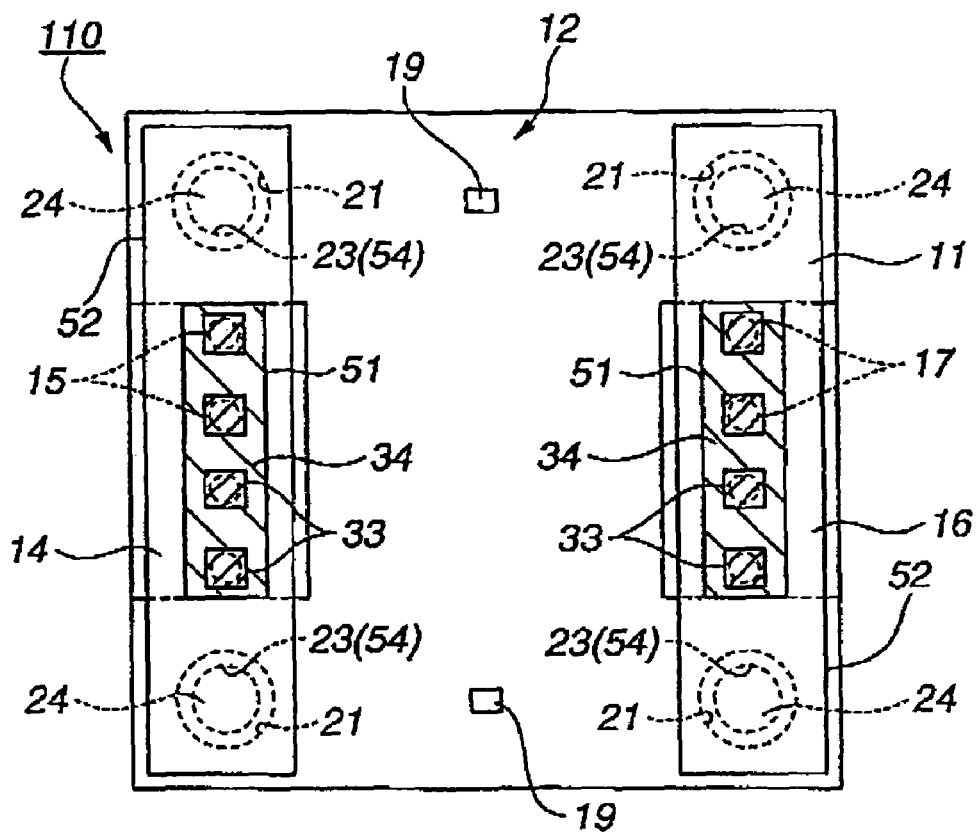
FIG. 14 is a schematic plan view illustrating an optical fiber connector equipped optical device mounted substrate assembly according to a third embodiment of the present invention.
Figure 15:
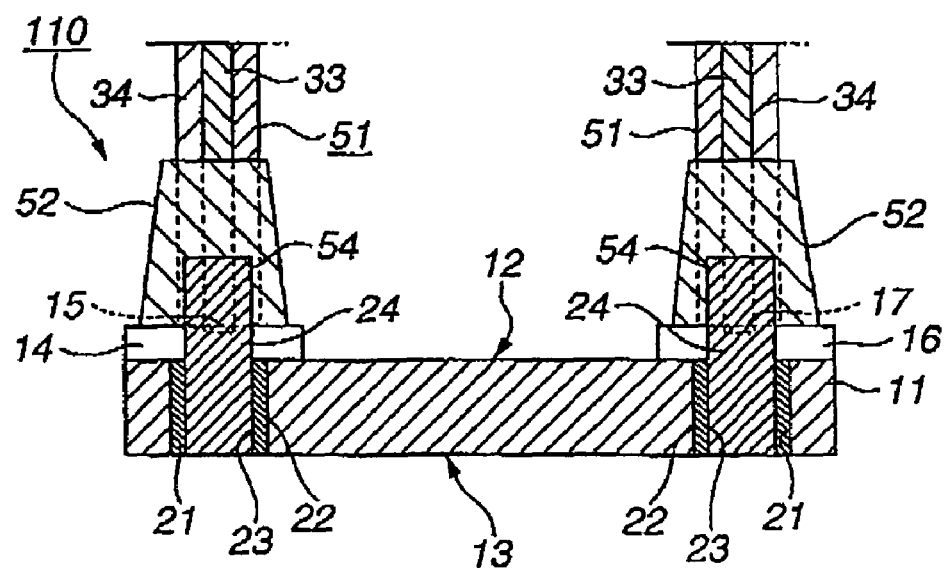
FIG. 15 is a schematic cross-sectional view of the optical fiber connector equipped optical device mounted substrate assembly.
Figure 16:
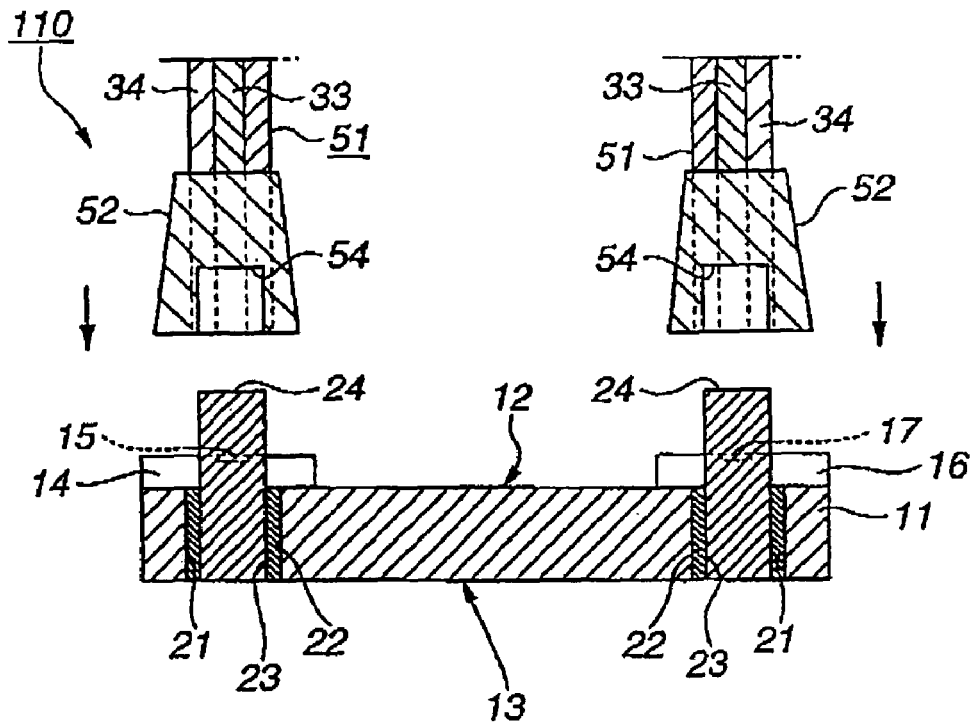
FIG. 16 is a schematic cross-sectional view illustrating a state that optical fiber connectors are fixed as a ceramic substrate is aligned with the optical fiber connectors in the fabrication process of the optical fiber connector equipped optical device mounted substrate assembly.

FIGS. 14 to 16 depict an optical fiber connector equipped optical device mounted substrate assembly (substrate assembly for supporting an optical component equipped with another optical component) 110 according to a third embodiment of the present invention. Here, the points different from the first embodiment will be described, but the same points as the first embodiment are only designated the same component numbers.

As shown in FIGS. 14 and 15, an optical fiber connector 52 of the optical fiber connector equipped optical device mounted substrate assembly 110 is a so-called MT connector disposed at the tip end of an optical fiber 51 of a multicore structure (four cores in FIG. 14). The end face (that is, the end of each of cores 33) of the optical fiber 51 is exposed in the lower end face of the optical fiber connector 52. A pair of alignment holes 54 opened in the lower end face is disposed at both ends in the lower end face of the optical fiber connector 52. Then, guide pins 24 of a ceramic substrate 11 are fitted in the alignment holes 54. Consequently, the optical fiber connector 52 on the left side is fixed to a top surface 12 of the ceramic substrate 11 as the optical axes are aligned with a VCSEL 14. The optical fiber connector 52 on the right side is fixed to the top surface 12 of the ceramic substrate 11 as the optical axes are aligned with a photodiode 16.

Also in the embodiment with the configuration, the same advantages as those of the first embodiment can be exerted.

[Fourth Embodiment]

Figure 17:
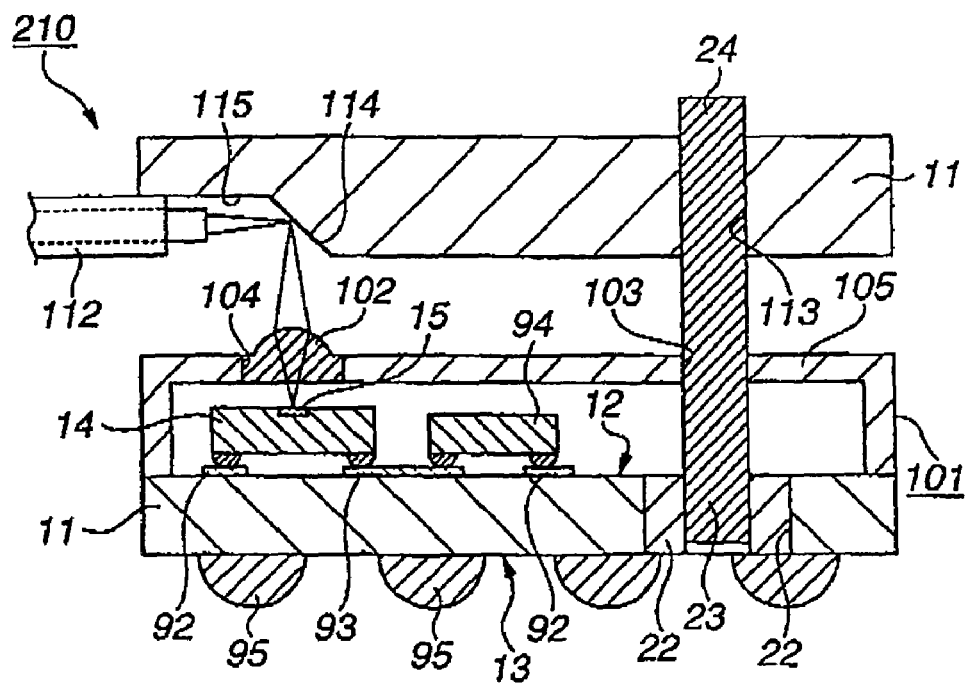
FIG. 17 is a schematic cross-sectional view illustrating an optical fiber connector equipped optical device mounted substrate assembly according to a fourth embodiment of the present invention.
Figure 18:
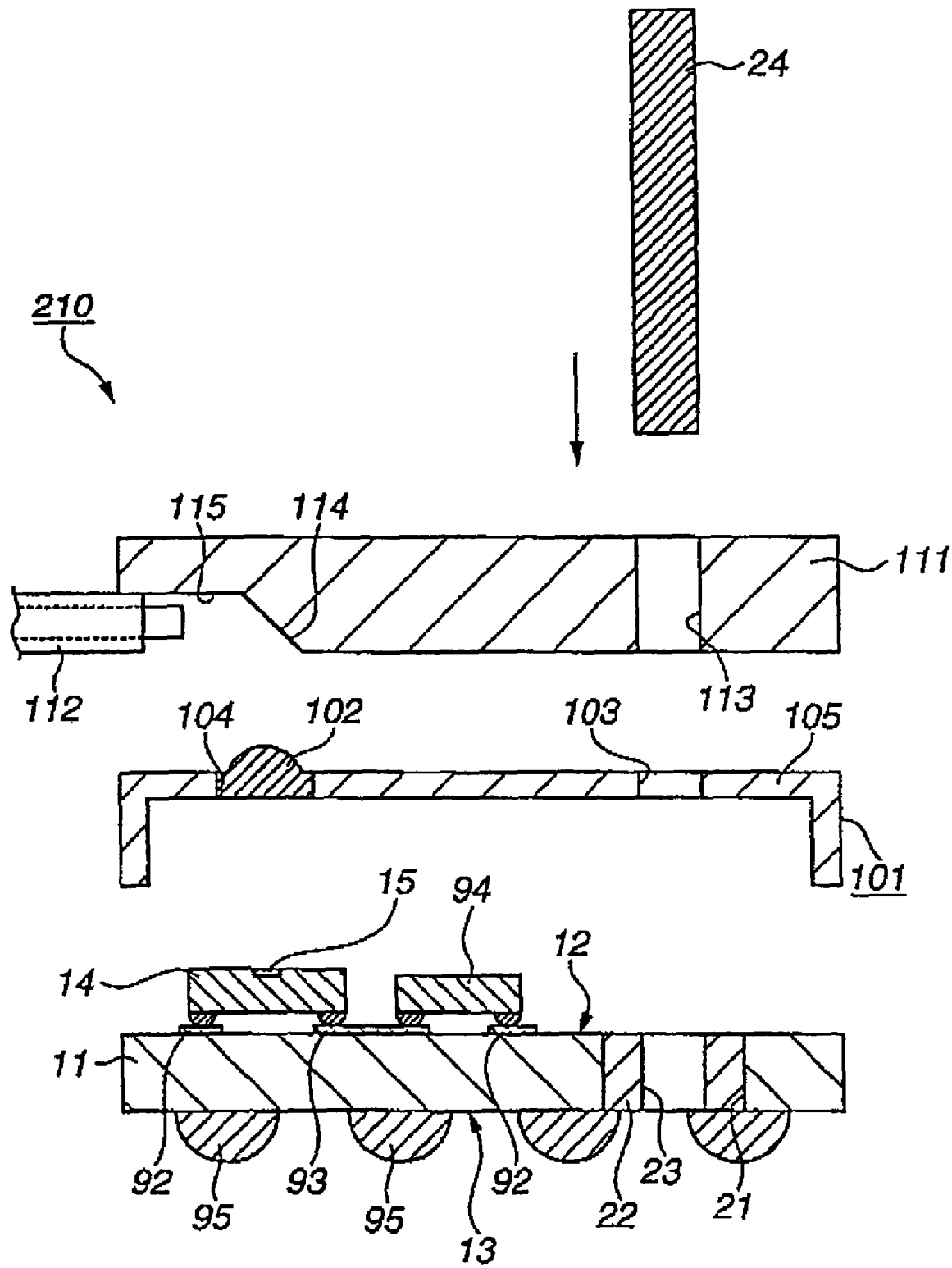
FIG. 18 is a schematic cross-sectional view illustrating a manner that components are fixed as a ceramic substrate, a microlens array and the optical fiber connector are aligned with each other in the fabrication process of optical fiber connector equipped optical device mounted substrate assembly.
Figure 19:
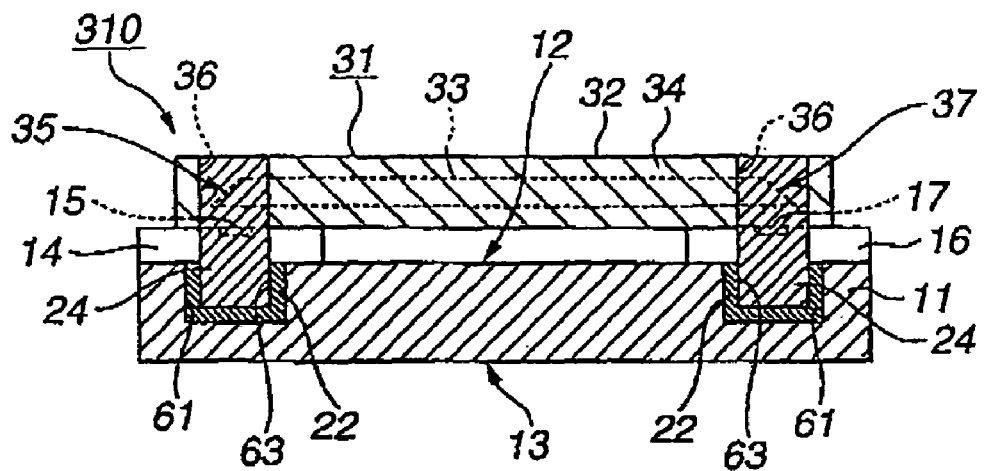
FIG. 19 is a schematic plan view of an optical waveguide equipped optical device mounted substrate assembly according to a fifth embodiment of the present invention.
Figure 20:
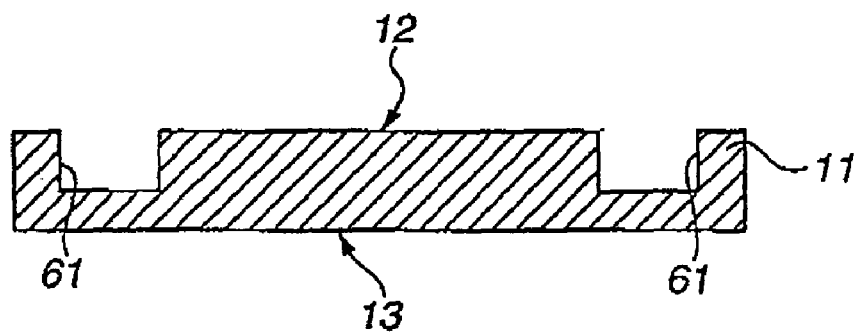
FIG. 20 is a schematic cross-sectional view illustrating a ceramic substrate formed with first non-through holes in the fabrication process of the optical waveguide equipped optical device mounted substrate assembly of the fifth embodiment.
Figure 21:
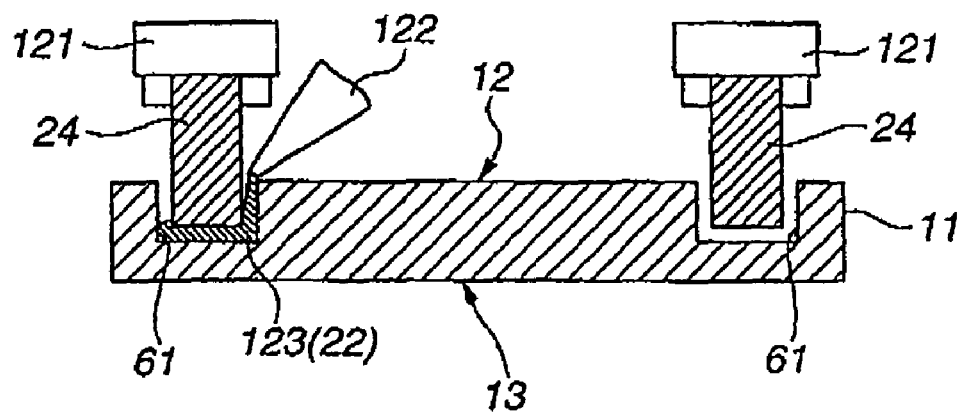
FIG. 21 is a schematic cross-sectional view illustrating a state of conducting a resin layer forming step and a guide member mounting step in the fabrication process of the optical waveguide equipped optical device mounted substrate assembly.
Figure 22:
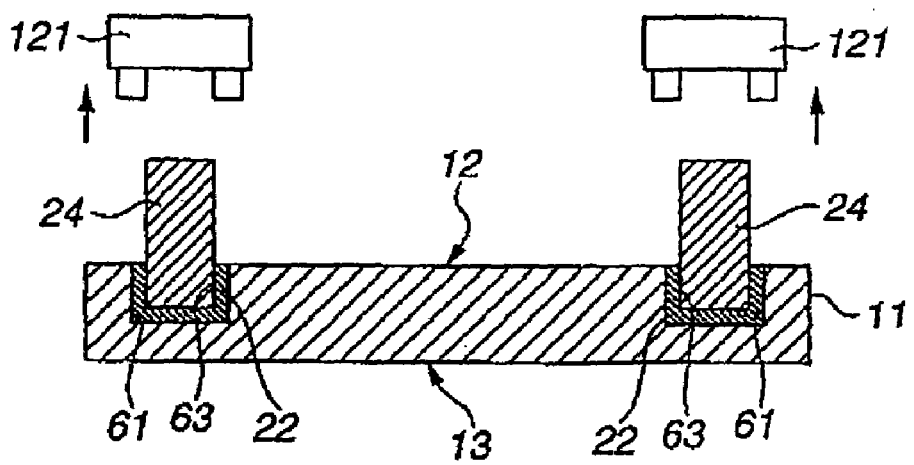
FIG. 22 is a schematic cross-sectional view illustrating a state that the resin layer forming and the guide member mounting step is completed in the fabrication process of the optical waveguide equipped optical device mounted substrate assembly.
Figure 23:
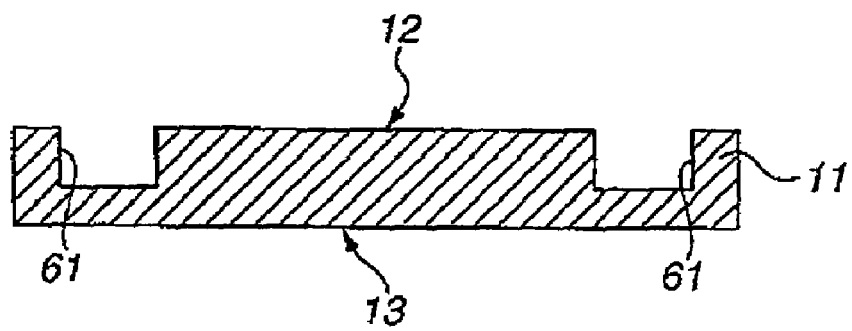
FIG. 23 is a schematic cross-sectional view illustrating the ceramic substrate formed with the first non-through holes in the fabrication process of the optical waveguide equipped optical device mounted substrate assembly according to the fifth embodiment of the present invention.
Figure 24:
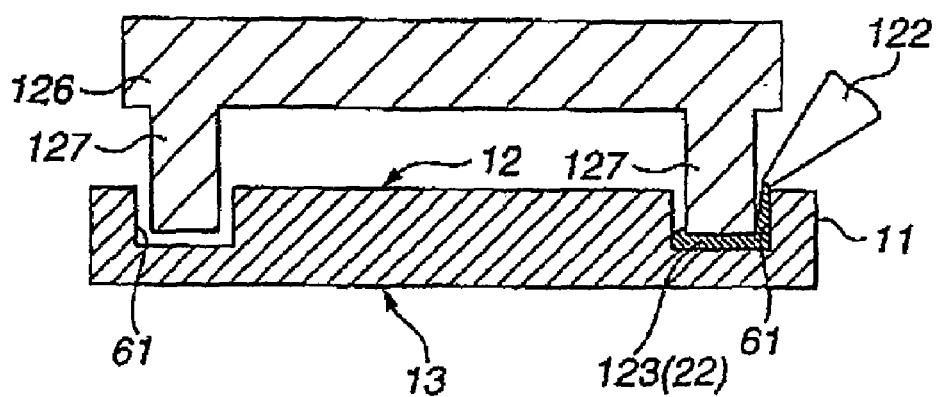
FIG. 24 is a schematic cross-sectional view illustrating a state of conducting a resin layer forming step and a second perforating step with a mold in the fabrication process of the optical waveguide equipped optical device mounted substrate assembly.
Figure 25:
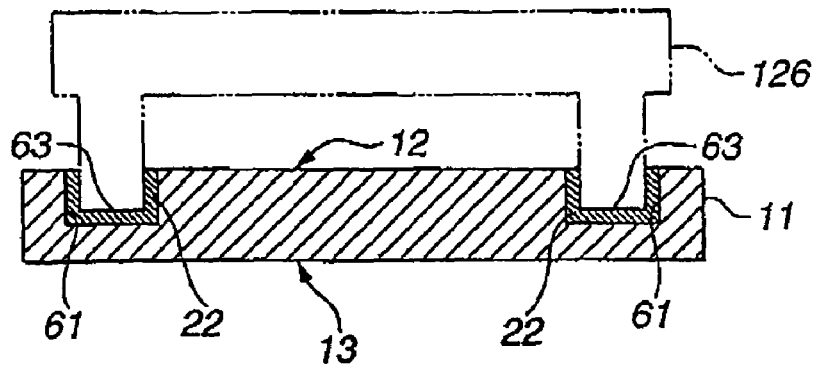
FIG. 25 is a schematic cross-sectional view illustrating a state that the resin layer forming step and the second perforating step are completed in the fabrication process of the optical waveguide equipped optical device mounted substrate assembly.
Figure 26:
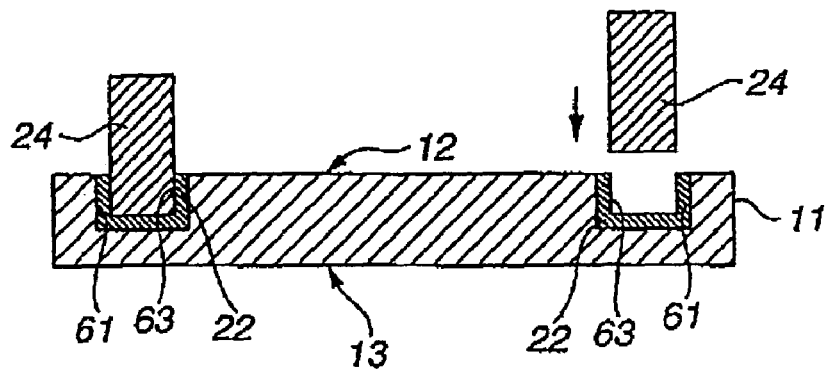
FIG. 26 is a schematic cross-sectional view illustrating a state that guide pins are fitted in second non-through holes in the fabrication process of the optical waveguide equipped optical device mounted substrate assembly.

FIGS. 17 and 18 depict an optical fiber connector equipped optical device mounted substrate assembly (substrate assembly for supporting an optical component equipped with another optical component) 210 according to a fourth embodiment of the present invention. FIG. 17 is a schematic cross-sectional view illustrating the optical fiber connector equipped optical device mounted substrate assembly 210. FIG. 18 is a schematic cross-sectional view illustrating a state that components are fixed as a ceramic substrate 11, a microlens array 101, and an optical fiber connector 111 are aligned with each other in the fabrication process of the optical fiber connector equipped optical device mounted substrate assembly 210.

As shown in FIGS. 17 and 18, the optical fiber connector equipped optical device mounted substrate assembly 210 of the embodiment is configured of a VCSEL 14 (optical device), the ceramic substrate 11 (substrate), the microlens array 101, the optical fiber connector 111, and a guide pin 24 (alignment guide member).

The ceramic substrate 11 is a nearly rectangular plate member having a top surface 12 (front surface) and an under surface 13. This ceramic substrate 11 is a so-called multilayer circuit board having metal interconnect layers. For example, a plurality of connecting pads 92 for mounting various electronic devices is formed on a part of a metal interconnect layer 93 on the top surface 12 (front surface). Not shown in the drawings, the metal interconnect layers are also formed in the inner layers of the ceramic substrate 11. The ceramic substrate 11 also has via hole conductors (omitted in the drawing), and the metal interconnect layers are in interlayer connection through the via hole conductors. Furthermore, a plurality of solder bumps 95 for connecting to the via hole conductors is formed on the under surface 13 of the ceramic substrate 11.

The VCSEL 14 (optical device), which is one kind of optical device (light emitting device), is mounted on the top surface 12 of the ceramic substrate 11 as the emission surface is faced upward. The VCSBL 14 has a plurality (here, four) of the light emitting parts 15 arranged in a row in the emission surface. Therefore, the light emitting parts 15 emit a predetermined wavelength of laser beams in the direction orthogonal to the top surface 12 of the ceramic substrate 11 (that is, toward the top of FIGS. 17 and 18). A plurality of terminals of the VCSEL 14 is joined to the connecting pads 92 disposed on the top surface 12 of the ceramic substrate 11. Moreover, instead of the light emitting device like the VCSEL 14, the configuration of mounting a light receiving device like a photodiode is acceptable, but the detailed description is omitted here.

Besides, an active circuit IC 94 (so-called driver IC) for driving the VCSEL 14 is disposed near the VCSEL 14 on the top surface 12 of the ceramic substrate 11. A plurality of terminals of the active circuit IC 94 is joined to the connecting pads 92 disposed on the top surface 12 of the ceramic substrate 11. Thus, the VCSEL 14 is electrically connected to the active circuit IC 94 through the metal interconnect layer 93.

As shown in FIGS. 17 and 18, a first through hole 21 is disposed as the first recess in the area where electronic devices are not mounted on the ceramic substrate 11. In the meantime, not shown in the drawings specifically, the first through hole 21 is disposed at two places in the embodiment. The first through holes 21 are circular in the same cross sections, and are opened in the top surface 12 (front surface) and the under surface 13 of the ceramic substrate 11. In the embodiment, the diameter of the first through hole 21 is formed to be about 1.0 to 2.0 mm. A resin layer 22 is provided inside the first through holes 21, and second through holes 23 (second recesses and substrate side alignment recesses) are provided at almost the center part of the resin layer 22. The second through holes 23 are circular in the same cross sections, and opened in the top surface 12 (front surface) and the under surface 13 of the ceramic substrate 11. In the embodiment, the diameter of the second through hole 23 is smaller than the first through hole 21, and formed to be about 0.7 mm. One end of the guide pin 24 (alignment guide member) made of stainless steel in a circular cross section is fitted in the two second through holes 23 (see FIG. 17). More specifically, guide pin CNF125A-21 (the diameter is 0.699 mm) defined by JIS C 5981 is used in the embodiment.

As shown in FIGS. 17 and 18, the microlens array 101 disposed on the top surface 12 (front surface) of the ceramic substrate 11 has a lid-shaped microlens array main body 105 having a housing recess on the bottom surface. The microlens array main body 105 is a resin product, in which a microlens mounting hole 104 is formed above the VCSEL 14. A convex microlens 102 made of a transparent resin material is mounted in the microlens mounting hole 104. An alignment hole 103 (microlens array side alignment recess) is formed at another place in the microlens array main body 105 as it penetrates through front and back sides. In the embodiment, the diameter of the alignment hole 103 is formed to be about 0.7 mm. Then, the guide pin 24 is inserted and fit into the alignment hole 103 like this. In the meantime, the microlens array 101 of the embodiment can be understood as the optical component having the light condensing function. It will do to configure the microlens 102 and the microlens array main body 105 as different products, but it is also acceptable to form them as one piece.

As shown in FIGS. 17 and 18, the optical fiber connector 111 disposed above the microlens array 101 is mounted at the tip end of an optical fiber 112. A notch 115 having an inclined plane at an angle of about 45° is disposed in the under part of the optical fiber connector 111 at the left end. An optical path switching mirror 114 (optical path switching part) made of a metal thin film that reflects light is formed in the inclined plane of the notch 115. For example, the optical fiber connector 111 having the notch 115 can be shaped by molding with a synthetic resin material, and can also be shaped by etching with a metal material such as silicon. The optical fiber connector 111 formed with the optical path switching mirror 114 of the embodiment can also be understood as the optical component having the light reflecting function (that is, the optical path switching component).

A plurality of the alignment holes 113 (optical component side alignment recesses) is formed at predetermined positions in the optical fiber connector 111 so as to penetrate through front and back sides. In the embodiment, the diameter of the alignment hole 113 is formed to be about 0.7 mm. Then, the guide pins 24 are inserted and fit into these alignment holes 113.

In the optical fiber connector equipped optical device mounted substrate assembly 210 thus configured, the ceramic substrate 11, the microlens array 101, and the optical fiber connector 111 are fixed to each other and aligned with each other by fitting of the guide pins 24. Here, more specifically, 'being aligned' is a state that the optical axis of each of the light emitting parts 15 of the VCSEL 14, the optical axis of each of the microlens 102, and the optical axis of each of the cores of the optical fiber 112 are aligned with each other.

The general operations of the optical fiber connector equipped optical device mounted substrate assembly 210 thus configured will be described briefly.

The VCSEL 14 is operable by power supply from the ceramic substrate 11 side. When electrical signals are outputted from the active circuit IC 94 on the ceramic substrate 11 to the VCSEL 14, the VCSEL 14 converts the inputted electrical signals to optical signals (laser beams), and emits the optical signals from the light emitting parts 15 upward. The optical signals having been emitted from the light emitting parts 15 travel as they are spreading, they are condensed when passing through the microlens 102, and then they reach the optical path switching mirror 114. The optical signals having entered the optical path switching mirror 114 change the traveling direction there at an angle of 90°, and enter one end of the optical fiber 112. Furthermore, a photodiode, not shown, is disposed near the other end of the optical fiber 112, and the optical signals finally reach the photodiode.

Next, a fabrication method of the optical fiber connector equipped optical device mounted substrate assembly 210 will be described.

First, a silicon base material is etched to form the notch 115 with the inclined plane. Then, gold is sputtered onto the inclined plane to form the optical path switching mirror 114. Furthermore, the silicon base material undergoes precision drilling to form the alignment through holes 113 penetrating through the front and back sides thereof. Since the silicon base material is not so hard as ceramic materials, holes can be formed highly accurately by precision drilling relatively easily. Subsequently, the end of the optical fiber 112 is joined to the notch 115 of the optical fiber connector 111 thus formed. In the meantime, it will do to conduct precision drilling for the silicon base material before the step of forming the optical path switching mirror 114. Besides, it is acceptable to form the optical path switching mirror 114 by techniques other than sputtering (for example, vacuum deposition and CVD)

In the meantime, after the microlens array main body 105 is fabricated by molding with a synthetic resin, and the microlens array main body 105 undergoes precision drilling to form the alignment through holes 103 penetrating through the front and back sides thereof. Since the synthetic resin materials are not so hard as the ceramic materials in general, holes can be formed highly accurately by precision drilling relatively easily. It will do to form the microlens mounting hole 104 in precision drilling, but it is acceptable to form it in molding. Then, the microlens 102 is mounted in the microlens mounting hole 104 to complete the microlens array 101.

Moreover, the ceramic substrate 11 is fabricated in accordance with the following procedures. Alumina powder, an organic binder, a solvent, and a plasticizer are uniformly mixed and kneaded to form row material slurry, and a doctor blade apparatus is used to shape a sheet with the row material slurry to form a green sheet in a predetermined thickness. The green sheet is punched at predetermined places, and a metal paste for forming via hole conductors is filled in the holes formed. Besides, a metal paste is printed on the surface of the green sheet to form a printed layer to be the metal interconnect layer later. Subsequently, a plurality of the green sheets is laminated and pressed into one piece, and a green sheet layered product is formed. After that, the green sheet layered product is punched to form the first through holes 21 (first recesses) (a first perforating step). Since it is unsintered at this stage, holes can be formed relatively easily at low cost. In the first perforating step, perforating is carried out so that the inner diameter of the first through hole 21 (first recess) after a firing step is greater than the inner diameter (about 0.7 mm) of the second through hole 23 (the second recesses and the substrate side alignment recesses) and the diameter (about 0.7 mm) of the guide pin 24. More specifically, the first through holes 21 is formed so as to be to 2.4 mm in diameter. This is because the first through holes 21 (first recesses) need to form greater in the consideration that ceramics are shrunk after the firing step and the first through holes 21 (first recesses) become smaller in diameter and shifted in alignment. Then, after a drying step and a degreasing step are conducted in accordance with well-known techniques, the firing step is conducted at temperatures that alumina can be sintered. Accordingly, the green sheet layered product (unsintered ceramic product) is sintered to form the ceramic substrate 11. At this point of time, the ceramic is hardened and shrunk.

In a subsequent resin layer forming step, the resin layer 22 is formed in the first through holes 21 (first recesses) as below. First, 5 parts by weight of a curing agent (2P4MZ-CN made by Shikoku Corp.), 200 parts by weight of a silica filler (TSS-6 made by Tatsumori) treated with a silane coupling agent (KBM-403 made by Shin-Etsu Chemical Co., Ldt.), and an anti-foaming agent (BERENOL S-4 made by SAN NOPCO LIMITED) are mixed to 80 parts by weight of bisphenol F epoxy resin (Epikote 807 made by JER Co., Ltd.) and 20 parts by weight of a cresol novorac epoxy resin (Epikote 152 made by JER Co., Ltd.). The mixture is kneaded with triple rolls to form a resin material for forming the resin layer 22. That is, an uncured resin material containing an inorganic filler in a thermosetting resin is used in the embodiment.

Subsequently, the ceramic substrate 11 is set in a printing apparatus, and a predetermined metal mask (omitted in the drawing) is placed and contacted to the top surface 12. In this metal mask, openings are formed beforehand at places corresponding to the first through holes 21. The resin material is printed through the metal mask like this, and the resin material is fully filled in each of the first through holes 21 with no space. After that, the printed ceramic substrate 11 is removed from the printing apparatus, it is heated at a temperature of 120° C. for one hour to cure the resin layer 22 formed by filling the resin material to some extent (it is partially cured). Here, the reason why the resin layer 22 is not fully cured is that drilling or other machining conducted in a second perforating step can be attained with ease.

In the subsequent second perforating step, precision drilling with a precision drill is conducted to form the second through holes 23 (the second recesses and the substrate side alignment recesses) in the resin layer 22. According to this machining, the second through holes 23 can be formed which can support the guide pins 24 to be the reference in the optical axis alignment at desired right positions.

After that, a full curing step in which the ceramic substrate 11 is heated at a temperature of 150° C. for five hours is conducted to fully cure the resin layer 22. Furthermore, known finish machining is conducted for fine adjustment of the second through holes 23, thereby adjusting the diameter of the second through hole 23 to 0.700 mm. More specifically, the accuracy required for machining at this time is ±0.001 mm.

A solder paste is printed onto the connecting pads 92 on the top surface 12 of the ceramic substrate 11, and then the VCSEL 14 and the active circuit IC 94 are mounted for reflow. Consequently, terminals of the connecting pads 94, the VCSEL 14, and the active circuit IC 94 are joined through the solder, In a subsequent guide member fitting step, the guide pins 24 are first pressed to fit in the second through holes 23 (the second recesses and the substrate side alignment recesses) with a jig for exclusive use.

In a subsequent alignment step, each of the guide pins 24 extended from the ceramic substrate 11 is fitted in the alignment holes 103 (optical component side alignment recesses) of the microlens array 101. Accordingly, the microlens array 101 is fixed to the ceramic substrate 11 as the optical axis alignment of each of the light emitting parts 15 of the VCSEL 14 with each of the microlenses 102 is conducted. At this time, it is acceptable to reliably join the interface between the microlens array 101 and the ceramic substrate 11 with an adhesive. Furthermore, each of the guide pins 24 is fitted in each of the alignment holes 113 (optical component side alignment recesses) of the optical fiber connector 111. Thus, the optical axes of each of the light emitting parts 15 of the VCSEL 14, each of the microlenses 102, and each of the cores of the optical fiber 112 are aligned with each other, and the optical fiber connector 111 is fixed to the ceramic substrate 11. Then, the optical fiber connector equipped optical device mounted substrate assembly 210 of the embodiment is completed as described above.

Therefore, the embodiment can obtain the following advantages.

(1) The embodiment is configured in which the fitting relationship between the guide pins 24 fitted in the second through holes 23 and the alignment holes 103 and 113 achieves the optical axis alignment and the ceramic substrate 11, the microlens array 101, and the optical fiber connector 111 are fixed to each other. Thus, the optical axes are aligned more positively and highly accurately than the traditional passive optical axis alignment that relies only on the self-alignment effect in reflow. Therefore, the optical fiber connector equipped optical device mounted substrate assembly 210 is small in optical transmission loss and sufficiently ready for high speed and high density optical communication. Furthermore, since the ceramic substrate with thermal conductivity 11 higher than that of the resin substrate is used, the heat generated from the VCSEL 14 and the active circuit IC 94 is dissipated efficiently. Accordingly, the optical fiber connector equipped optical device mounted substrate assembly 210 excellent in stable operations and reliability can be realized in which a drift in the emission wavelength caused by a deterioration of heat dissipation can also be avoided.

(2) According to the fabrication method of the embodiment, the optical fiber connector equipped optical device mounted substrate assembly 210 with the configuration described above can be fabricated reliably at low cost.

[Fifth Embodiment]

Next, an optical waveguide equipped optical device mounted substrate assembly (substrate assembly for supporting an optical component equipped with another optical component) 310 according to a fifth embodiment of the present invention will be described with reference to FIGS. 19 to 26.

In the first embodiment, the first through holes 21 are formed as the first recesses and the second through holes 23 are formed as the second recesses. However in the embodiment, first non-through holes 61 are formed as the first recesses and second non-through holes 63 are formed as the second recesses. The other configurations are the same. Hereinafter, a fabrication method of the optical waveguide equipped optical device mounted substrate assembly 310 will be described.

(First Fabrication Method)

First, a ceramic substrate 11 is fabricated in accordance with the procedures of the first embodiment. Here, a green sheet layered product is drilled to form the first non-through holes 61 (first recesses) at predetermined places (a first perforating step). Since it is unsintered in this stage, holes can be formed relatively easily at low cost. Then, after a drying step and a degreasing step are conducted in accordance with well-known techniques, a firing step is conducted at temperatures that alumina can be sintered. Accordingly, the green sheet layered product (unsintered ceramic product) is fired to form the ceramic substrate 11 (see FIG. 20). At this point of time, the ceramic is hardened and shrunk.

Subsequently, the upper ends of a plurality of guide pins 24 being the alignment guide members are held and fixed by chucks 121 being guide member holding jigs. Then, the guide pins 24 are held as the lower ends of the held guide pins 24 are inserted into the first non-through holes 61. At this time, the guide pins 24 are aligned highly accurately in the X-Y direction. Furthermore, a dispenser 122 is used to fill an uncured resin material 123 in the first non-through holes 61 (see FIG. 21). In the embodiment, the uncured resin material containing an inorganic filler in a thermosetting resin is used as similar to the first embodiment. Then, the filled resin material 123 is heated and cured, and then the holding by the chucks 121 is released. Consequently, a resin layer 22 having the second non-through hole 63 can be disposed at almost the center part thereof, and the guide pins 24 can be supported on the second non-through holes 63 (see FIG. 22, a resin layer forming and a guide member mounting step).

Therefore, according to the first fabrication method, since the resin layer forming step and the guide member mounting step are conducted at the same time, the number of process steps is more reduced than the fabrication method of the first embodiment. Accordingly, it is significantly advantageous for realizing cost reductions.

In the meantime, in the first fabrication method, it will do to use guide member holding jigs other than the chucks 121. Furthermore, it is acceptable to use units other than the dispenser 122 in filling the uncured resin material 123 in the first non-through holes 61. Moreover, the following modification is also possible. That is, the uncured resin material 123 is first filled in the first non-through holes 61, and then the lower ends of the guide pins 24 are inserted and held in the first non-through holes 61. In this order, the guide pins 24 do not become obstacles in filling the resin material 123, thus allowing a broad variety of choices for methods of filling the resin material 123. Accordingly, it is possible to use a technique of printing, for instance.

(Second Fabrication Method)

First, a ceramic substrate 11 is fabricated in accordance with the procedures of the first embodiment. Here, the green sheet layered product is drilled to form the first non-through holes 61 (first recesses) at predetermined places (a first perforating step). Since it is unsintered at this stage, holes can be formed relatively easily at low cost. Subsequently, after a drying step and a degreasing step are conducted in accordance with well-known techniques, a firing step is conducted at temperatures that alumina can be sintered. Accordingly, the green sheet layered product (unsintered ceramic product) is fired to form the ceramic substrate 11 (see FIG. 23). At this point of time, the ceramic is hardened and shrunk.

Then, a mold 126 being a spacer member is prepared. The mold 126 has a plurality of pins 127 corresponding to the shape of the guide pins 24 (see FIG. 24). Subsequently, the ceramic substrate 11 and the mold 126 are aligned in the X-Y direction highly accurately, the lower ends of the pins 127 are inserted into the first non-through holes 61, and then the mold 126 is held. Furthermore, a dispenser 122 is used to fill an uncured resin material 123 in the first non-through holes 61. In the embodiment, the uncured resin material containing an inorganic filler in a thermosetting resin is used as similar to the first embodiment. Then, the filled resin material 123 is heated and cured, and then the mold 126 is pulled up and removed. Consequently, the resin layer 22 having the second non-through hole 63 is formed at almost the center part thereof (see FIG. 25, a resin layer forming step and a second perforating step). Lastly, the guide pins 24 are pressed into each of the second non-through holes 63 for fitting and supporting (see FIG. 26, a guide member fitting step).

Therefore, according to the second fabrication method, since the resin layer forming step and the second perforating step are conducted at the same time, the process steps are more reduced than the fabrication method of the first embodiment. Accordingly, it is significantly advantageous for realizing cost reductions.

In the meantime, it will do to use a unit other than the dispenser 122 in filling the uncured resin material 123 in the first non-through holes 61 In the second fabrication method. Furthermore, the following modification is possible. That is, the uncured resin material 123 is first filled in the first non-through holes 61, and then the lower ends of the pins 127 of the mold 126 are inserted and held in the first non-through holes 61. In this order, the mold 126 does not become an obstacle in filling the resin material 123, thus allowing a broad variety of choices for methods of filling the resin material 123. Accordingly, it is possible to use a technique of printing, for example.

[Sixth Embodiment]

Figure 27:
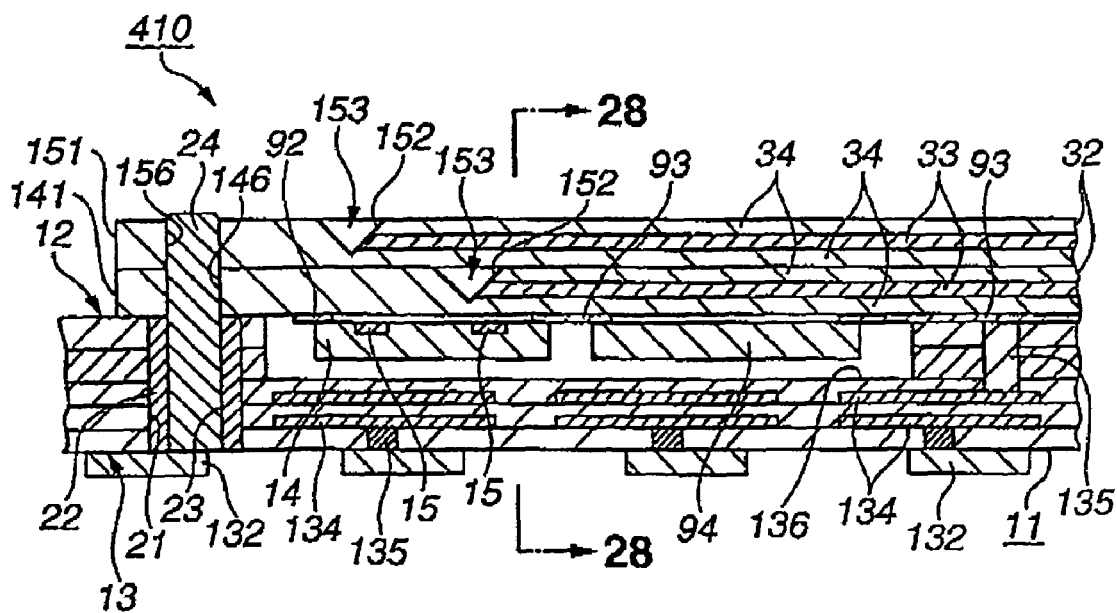
FIG. 27 is a schematic cross-sectional view illustrating an optical waveguides equipped optical device mounted substrate assembly of a sixth embodiment.
Figure 28:
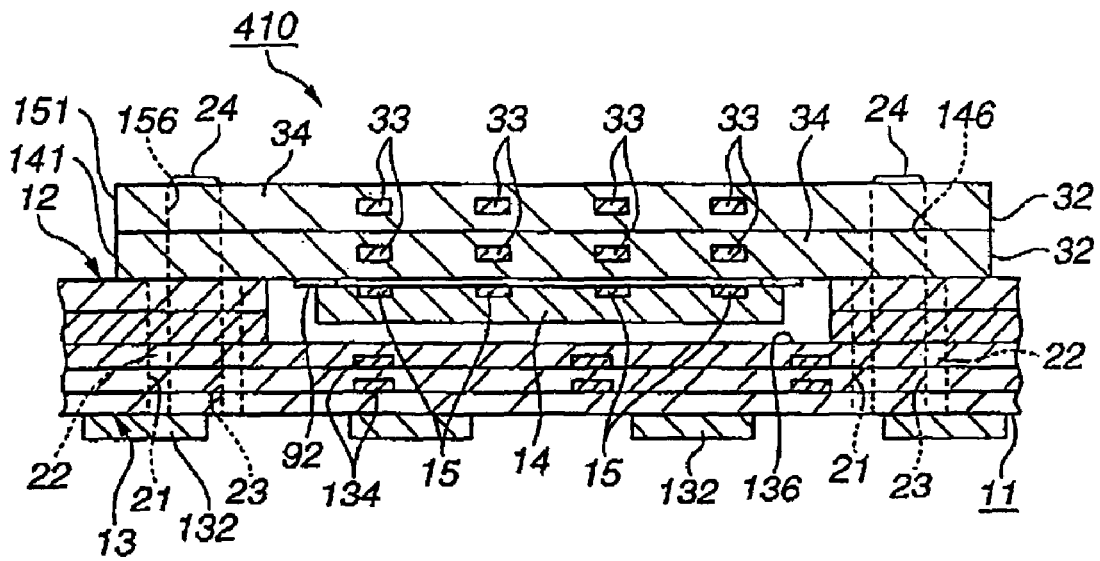
FIG. 28 is a cross-sectional view taken along line 28—28 of FIG. 27.
Figure 29:
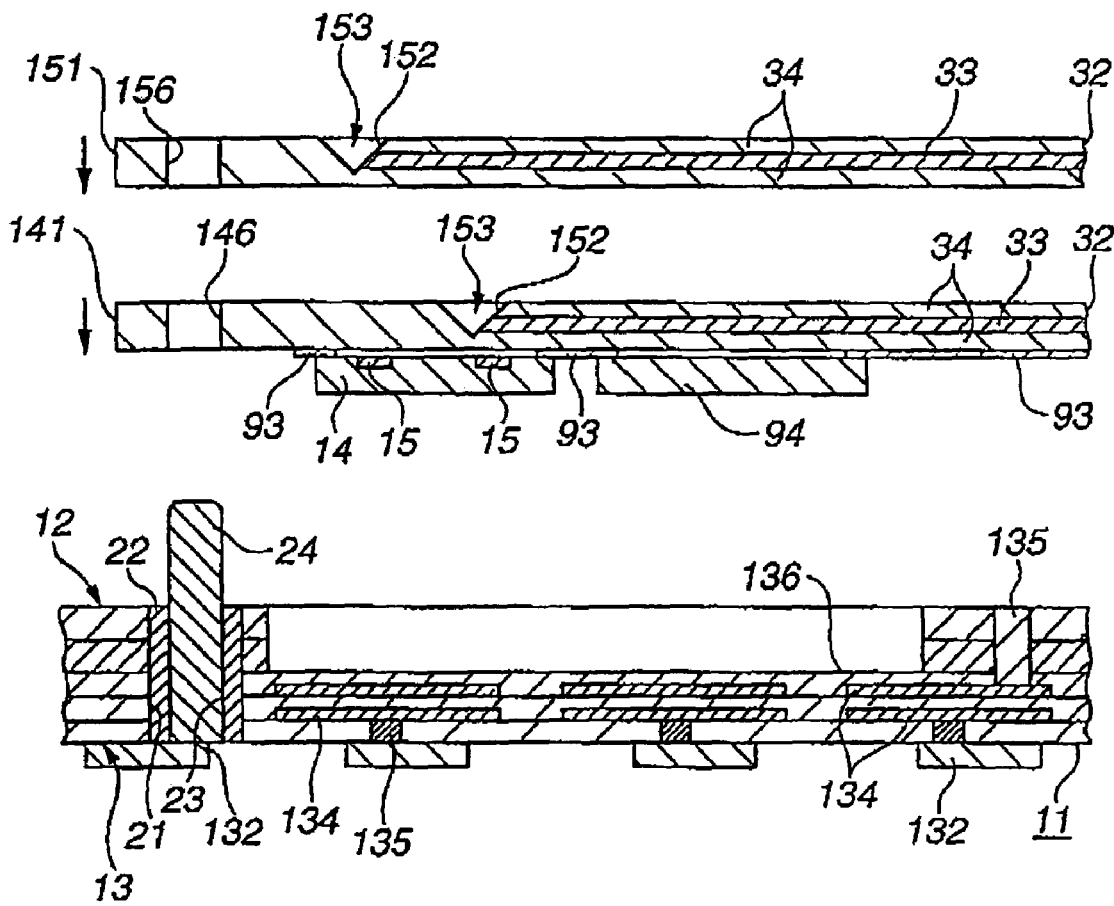
FIG. 29 is a schematic cross-sectional view illustrating a manner that components are fixed as a ceramic substrate, an under side optical waveguide, and an upper side optical waveguide are aligned with each other in the fabrication process of the optical device mounted substrate assembly.

FIGS. 27 to 29 depict an optical waveguide equipped optical device mounted substrate assembly (substrate assembly for supporting an optical component equipped with another optical component) 410 according to a sixth embodiment of the present invention. FIG. 27 is a schematic cross-sectional view illustrating the optical waveguide equipped optical device mounted substrate assembly 410. FIG. 28 is a cross-sectional view taken along line 28—28 of FIG. 27. FIG. 29 is a schematic cross-sectional view illustrating a state that components are fixed as a ceramic substrate 11, an under side optical waveguide 141, and an upper side optical waveguide 151 are aligned with each other in the fabrication process of the optical waveguide equipped optical device mounted substrate assembly 410.

As shown in FIGS. 27 and 28, the optical waveguide equipped optical device mounted substrate assembly 410 of the embodiment is configured of a VCSEL 14. (optical device), the ceramic substrate 11 (substrate), the under side optical waveguide 141 (optical component), the upper side optical waveguide 151 (optical component), and guide pins 24 (alignment guide members). In the meantime, the VCSEL 14 of the embodiment has two light emitting rows formed of four light emitting parts 15.

The ceramic substrate 11 is a nearly rectangular plate member having a top surface 12 (front surface) and an under surface 13. This ceramic substrate 11 is a so-called multi-layer circuit board, and has metal interconnect layers (that is, wiring patterns 134 and via hole conductors 135) inside thereof. A cavity 136 being a chip housing part is disposed at almost the center of the top surface 12. In the meantime, a plurality of external connecting terminals 132 is formed on the under surface 13. First through holes 21 are formed as the first recesses in the outer region of the ceramic substrate 11, and a resin layer 22 is formed in the first through holes 21. A second through hole 23 (the second recess and the substrate side alignment recess) is formed at almost the center part of the resin layer 22, and the guide pins 24 are fitted in the second through holes 23.

The under side optical waveguide 141 is placed and contacted to the top surface 12 of the ceramic substrate 11. A base material 32 configuring the under side optical waveguide 141 has cores 33 and a cladding 34. A V-groove 153 having an interior angle of about 90° is formed at a predetermined area of the base material 32, and a thin film 152 made of a metal which can total-reflect the light is deposited on the inner surface (inclined plane) of the V-groove 153. Consequently, an optical path switching mirror for switching the traveling direction of light emitted from the VCSEL 14 at an angle of about 90° is formed. This optical path switching mirror is disposed right above one of the light emitting rows of the VCSEL 14. Moreover, alignment holes 146 (optical component side alignment recesses) are penetrated through in the outer region of the base material 32 configuring the under side optical waveguide 141. The guide pins 24 are inserted and fit into the alignment holes 146.

Wiring layers (connecting pads 92 and metal interconnect layers 93) are formed on the under surface of the under side optical waveguide 141. Furthermore, the VCSEL 14 (optical device), which is one kind of optical device (light emitting device), and an active circuit IC 94 (so-called driver IC) are mounted on the under surface of the under side optical waveguide 141. Therefore, the light emitting parts 15 of the VCSEL 14 are disposed upward, and laser beams enter from the under surface of the under side optical waveguide 141 in emission. Since the under side optical waveguide 141 is basically a transparent material, the incident laser beams can travel through the top surface of the under side optical waveguide 141. In the meantime, the VCSEL 14 and the active circuit IC 94 are disposed as they are housed in the cavity 136. It will do to fill a silicon oil between the under surfaces of the VCSEL 14 and the active circuit IC 94 and the bottom surface of the cavity 136 for enhanced heat dissipation. In the embodiment, the under side optical waveguide 141 can be understood as the support that directly supports the optical device. In the meantime, the ceramic substrate 11 can also be understood as the substrate that indirectly supports the optical device through the under side optical waveguide 141.

The upper side optical waveguide 151 is placed and contacted to the top surface of the under side optical waveguide 141. A base material 32 configuring the upper side optical waveguide 151 has cores 33, a cladding 34, and an optical path switching mirror having a thin film 152 deposited on a V-groove 151. However, the optical path switching mirror of the upper side optical waveguide 151 is disposed at the position different from the position of the optical path switching mirror of the under side optical waveguide 141, more specifically, it is disposed right above the other of the light emitting rows of the VCSEL 14. That is, in the embodiment, the optical path switching mirror of the under side optical waveguide 141 and the optical path switching mirror of the upper side optical waveguide 151 are shifted in the direction in parallel to the under surface (more specifically, in the longitudinal direction of the cores 33) so as not to overlap each other when seen from the under surface of the under side optical waveguide 141, for example. Thus, the interference of incident light can be avoided, and the optical coupling of each of the cores 33 to the VCSEL 14 is not hampered. Moreover, the alignment holes 156 (optical component side alignment recesses) are penetrated through in the outer region of the base material 32 configuring the upper side optical waveguide 151. The guide pins 24 are inserted and fit into the alignment holes 156.

In the embodiment, the ceramic substrate 11, the under side optical waveguide 141, and the upper side optical waveguide 151 are fixed as they are aligned with each other by fitting of the guide pins 24. Here, more specifically, 'being aligned' is a state that the optical axis of each of the light emitting parts 15 of the VCSEL 14 is aligned with the optical axis of each of the cores 33 of the under side optical waveguide 141 and the upper side optical waveguide 151.

Therefore, according to the embodiment, the following advantage is exerted.

(1) The embodiment is configured in which the fitting relationship of the guide pins 24 achieves the optical axis alignment and the ceramic substrate 11, the under side optical waveguide 141, and the upper side optical waveguide 151 are fixed to each other. Thus, the optical axes are aligned more positively and highly accurately than the traditional passive optical axis alignment that relies only on the self-alignment effect in reflow. Therefore, the optical waveguide equipped optical device mounted substrate assembly 410 is small in optical transmission loss and sufficiently ready for high speed and high density optical communication. Furthermore, since the ceramic substrate with thermal conductivity 11 higher than that of the resin substrate is used, the heat generated from the VCSEL 14 and the active circuit IC 94 is dissipated efficiently. Accordingly, the optical waveguide equipped optical device mounted substrate assembly 410 excellent in stable operations and reliability can be realized in which a drift in the emission wavelength caused by a deterioration of heat dissipation can also be avoided.

(Modified Example)

Figure 30:
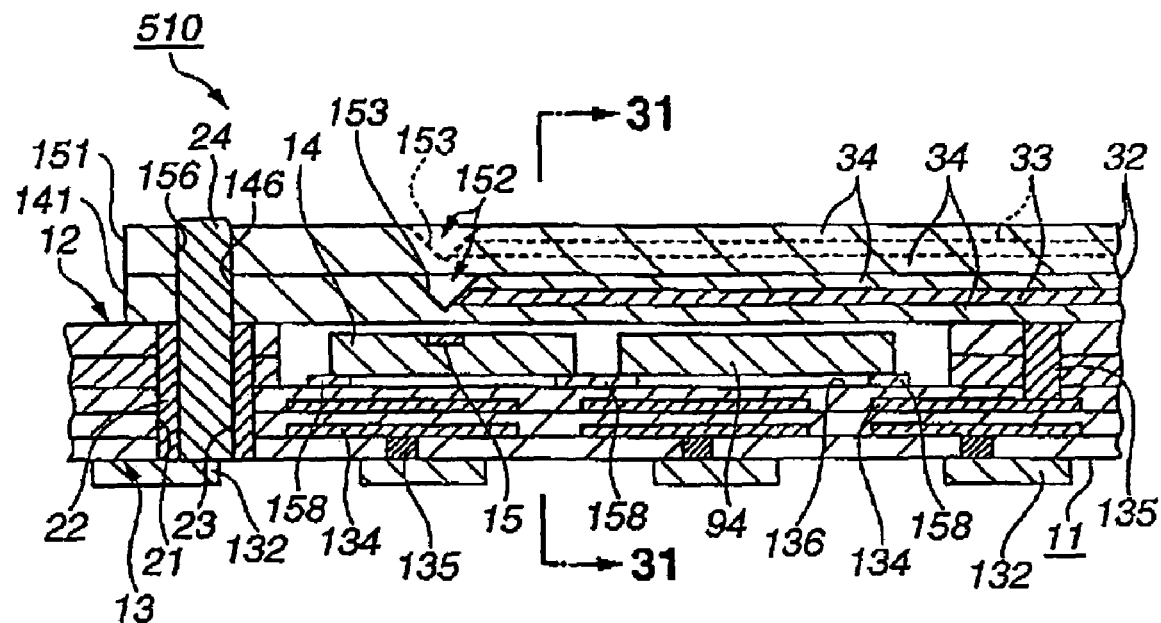
FIG. 30 is a schematic cross-sectional view illustrating an optical waveguide equipped optical device mounted substrate assembly that is a modification of the sixth embodiment.
Figure 31:
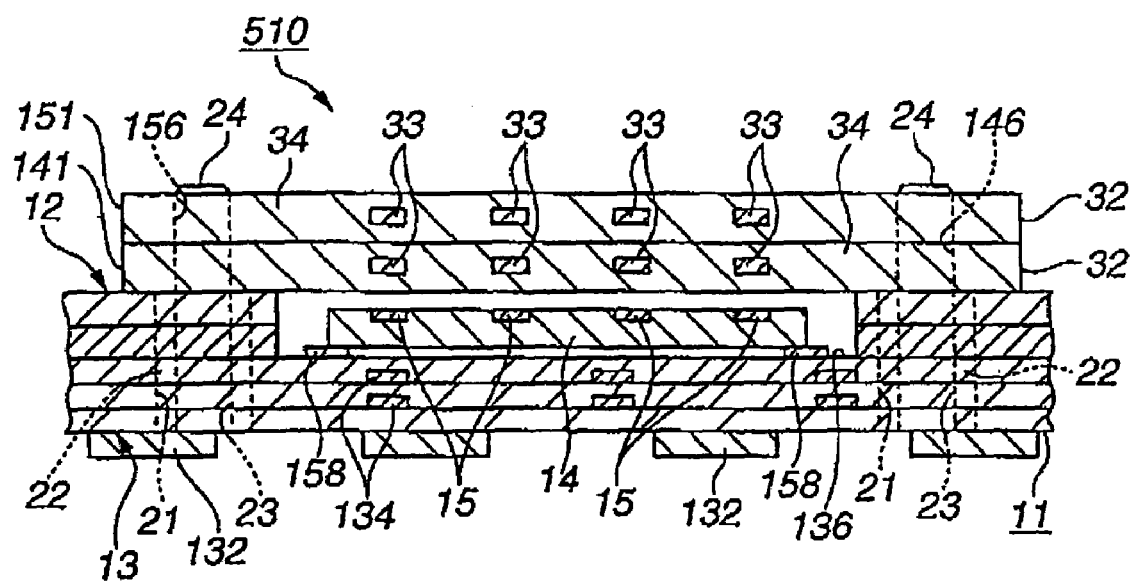
FIG. 31 is a cross-sectional view taken along line 31—31 of FIG. 30.

FIGS. 30 and 31 depict a modified example of the optical waveguide equipped optical device mounted substrate assembly (substrate assembly for supporting an optical component equipped with another optical component) 510 according to the sixth embodiment of the present invention. FIG. 30 is a schematic cross-sectional view illustrating an optical waveguide equipped optical device mounted substrate assembly 510 of the modified example. FIG. 31 is a cross-sectional view taken along line 31—31 of FIG. 30.

In the optical waveguide equipped optical device mounted substrate assembly 510, the wiring layers (the connecting pads 92 and the metal interconnect layer 93) of the under side optical waveguide 141 are omitted, and instead, connecting pads 158 are disposed on the bottom surface of a cavity 136. A VCSEL 14 and an active circuit IC 94 are soldered on the connecting pads 158. Furthermore, each of cores 33 of an upper side optical waveguide 151 and each of cores 33 of an under side optical waveguide 141 are shifted in the width direction of the cores 33 so as not to overlap each other when observed from the under surface (see FIG. 31). Moreover, a shift in this case is set to a half of the distance between the center lines of the cores 33. Therefore, the interference of incident light and outgoing light can also be avoided in the modified example, and the optical coupling of each of the cores 33 to the VCSEL 14 is not hampered.

[Seventh Embodiment]

Figure 32:
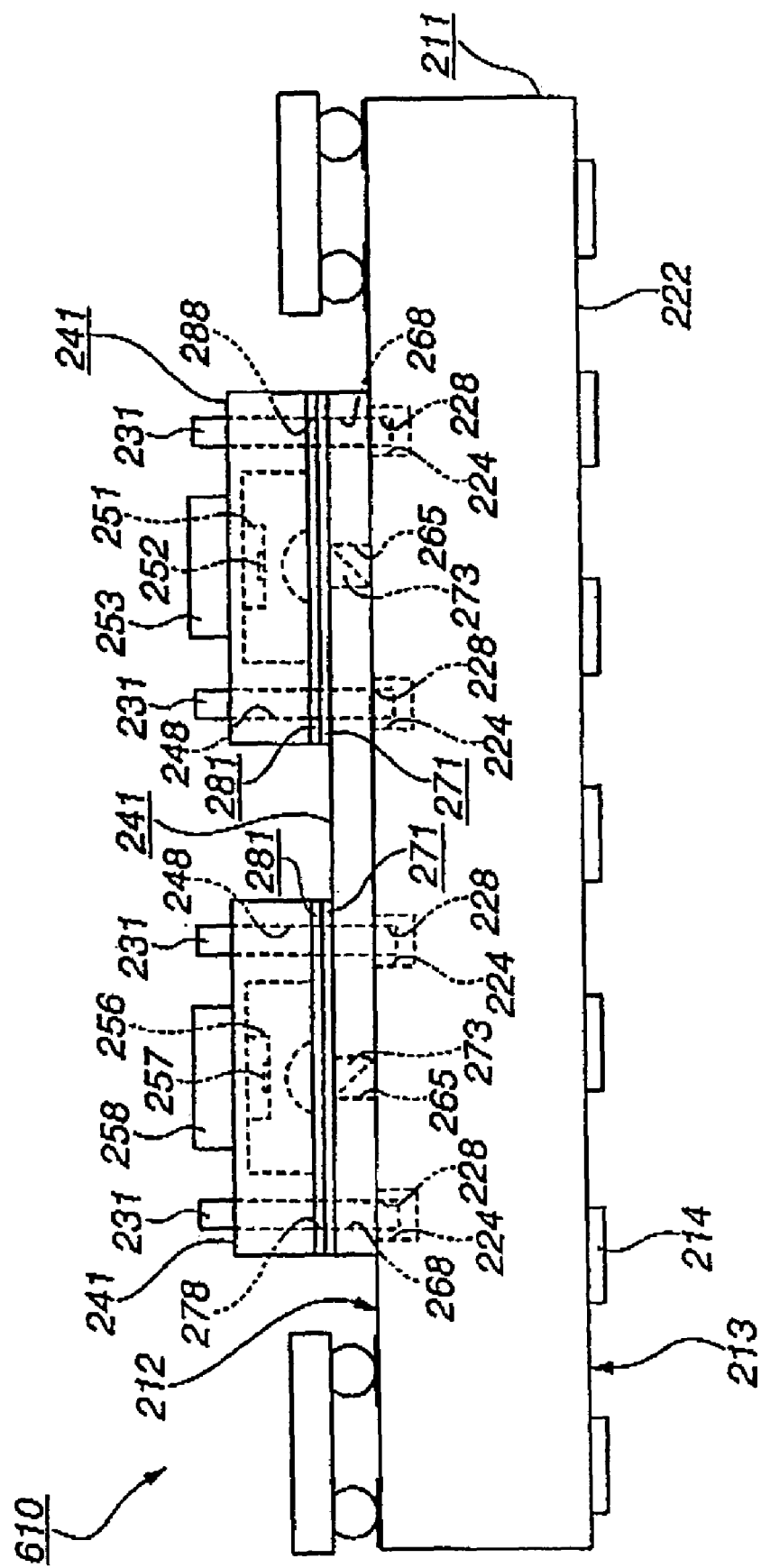
FIG. 32 is a schematic side view of a photoelectric composition circuit structure according to a seventh embodiment of the present invention.

FIG. 32 depicts a photoelectric composite circuit structure 610 according to a seventh embodiment of the present invention. The photoelectric composite circuit structure 610 includes a plurality of components: an optical interposer 241 (optical device mounted substrate assembly), an electric circuit board 11, an optical waveguide layer 261, an optical path switching component 271, a microlens array 281, and a guide pin 231 (alignment guide member).

Figure 33:
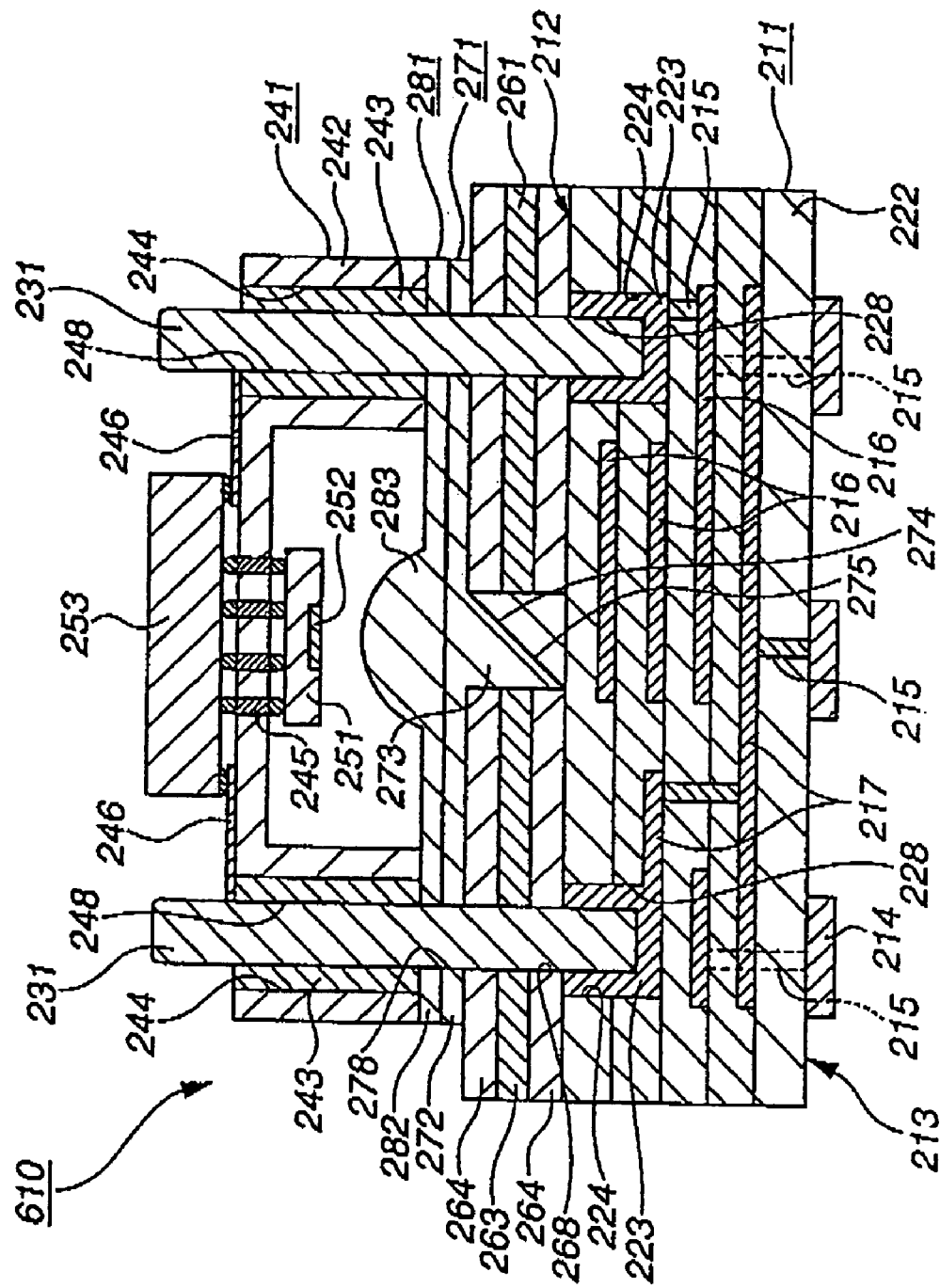
FIG. 33 is an enlarged, schematic cross-sectional view of the photoelectric composition circuit structure.

As shown in FIG. 33, the electric circuit board 211 is formed of an electric circuit board main body 222, which is a nearly rectangular plate having a top surface 212 and an under surface 213. This electric circuit board 211 is a so-called ceramic multilayer circuit board, having conductor circuits 216 and 217 on the top surface 212 and in the inner layers. The conductor circuit 216 is a signal layer and the conductor circuit 217 is a power source layer. The electric circuit board 211 has via hole conductors 215 for interlayer connection. A plurality of connecting pads 214 is disposed on the under surface 213 of the electric circuit board main body 222.

As shown in FIGS. 32 and 33, first recesses 224 are disposed at a plurality of places in the electric circuit board main body 222. The first recesses 224 are circular in the same cross section, and opened only in the top surface 212 of the electric circuit board main body 222. In the embodiment, the diameter of the first recess 224 is formed to be about 1.0 to 2.0 mm. Furthermore, four first recesses 224 are disposed on both of the emission side and the light receiving side in the embodiment.

A conductive filling product 223 (second recess forming part) is filled in the first recesses 224. In the embodiment, the conductive filling product 223 is formed of a tungsten paste for forming via hole conductors. Moreover, the conductor circuits 217 allocated as the power source layer are electrically connected to the conductive filling product 223 placed on the left side in FIG. 33 in the inner layer of the electric circuit board 11. The conductor circuits 216 allocated as the signal layer are electrically connected to the conductive filling product 223 placed on the right side in FIG. 33 through the via hole conductors 215 in the inner layer of the electric circuit board 211.

An Alignment hole 228 being a second recess (electric circuit board side alignment recess) is disposed at almost the center part of the conductive filling product 223. The alignment hole 228 is circular in the same cross section, and opened only in the top surface 212 of the electric circuit board main body 222. In the embodiment, the diameter of the alignment hole 228 is smaller than that of the first recess 224 and formed to be about 0.7 mm. The guide pins 231 (alignment guide members) made of stainless steel circular in the cross section are fit and supported on eight alignment holes 228 as one ends thereof are extended from the top surface. More specifically, guide pin CNF125A-21 (the diameter is 0.699 mm) defined by JIS C 5981 is used in the embodiment. In the meantime, since the guide pins are made of stainless steel, they have preferable strength and conductivity.

Figure 34:
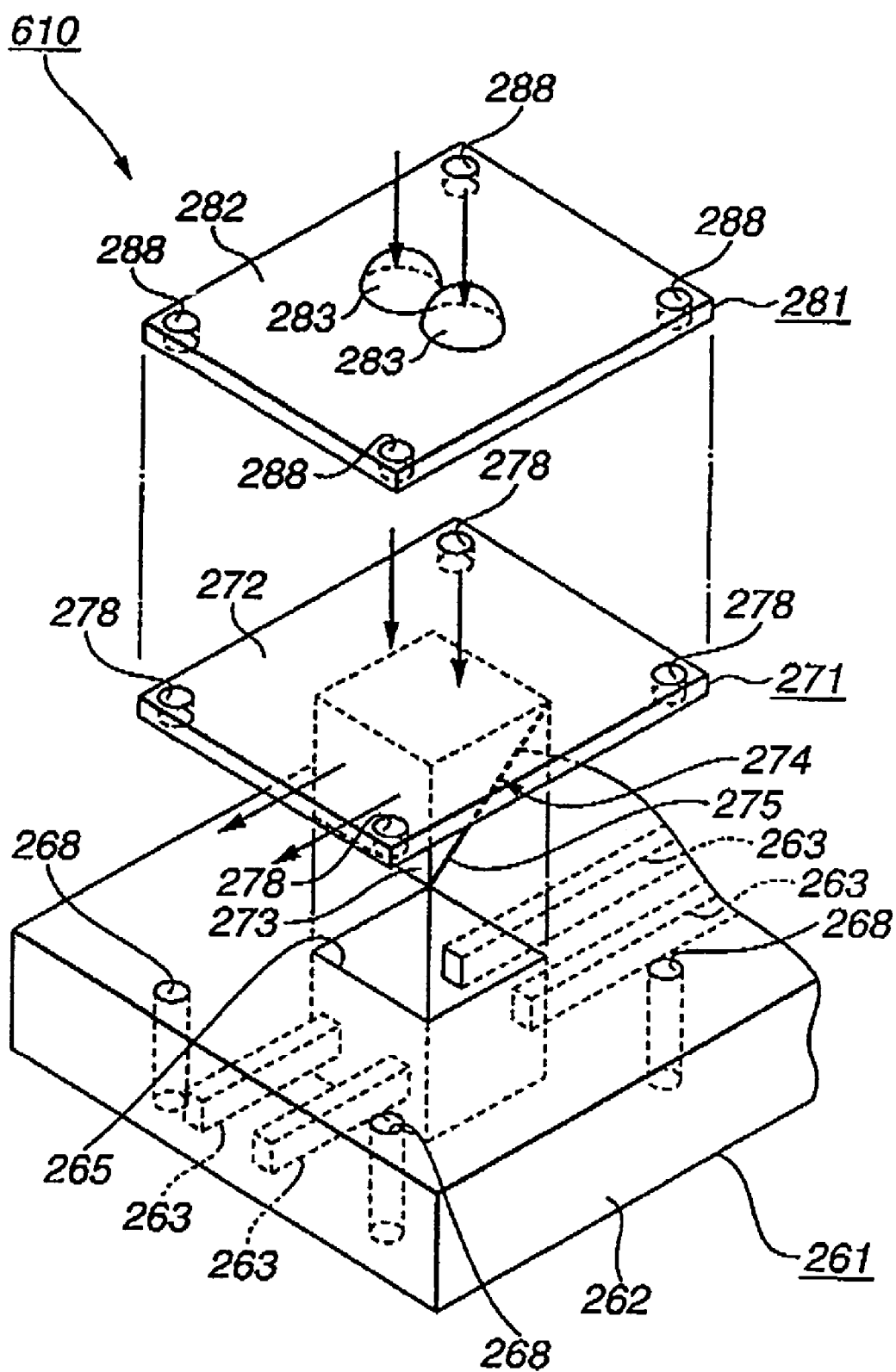
FIG. 34 is a schematic, exploded perspective view of an optical waveguide layer and a microlens array of the photoelectric composition circuit structure.

As shown in FIGS. 32, 33 and 34, the optical waveguide layer 261 is disposed on the top surface 212 of the electric circuit board 211. The optical waveguide layer 261 is formed of an organic optical waveguide layer main body 262, having an under layer cladding 264, cores 263, and an upper layer cladding 264. The cores 263 are substantially the portions to be optical paths through which optical signals propagate, and are surrounded by the under layer cladding 264 and the upper layer cladding 264. In the embodiment, the claddings 264 and the cores 263 are formed of transparent polymer materials with different refraction indexes, more specifically, PMMA (polymethyl methacrylate) with different refraction indexes. Such PMMA has thermosetting properties. As shown in FIG. 34, the cores 263 to be optical paths are two in the embodiment, which are formed to extend straight and in parallel. In the meantime, the number of the cores 263 can be one or more. The material to form the cores 263 is formed to have the refraction index a few percent higher than that of the material to form the claddings 264. The thicknesses of the claddings 264 and the cores 263 are formed to be about a few tens μm. Consequently, the thickness of the optical waveguide layer main body 262 is about 150 to 200 μm.

A component insertion hole 265 is penetrated in the midway of the cores 263, which is opened in the top surface and the under surface of the optical waveguide main body 262. The component insertion hole 65 of the embodiment is formed so as to cross (stretch across) the two cores 263 (see FIG. 34). One of the component insertion holes 265 is placed right under the optical interposer 241 on the emission side, and the other of the component insertion holes 265 is placed right under the optical interposer 241 on the light receiving side. Furthermore, the shape of the component insertion hole 265 seen from the thickness direction of the optical waveguide layer 261 is nearly rectangular, and the dimension of one side thereof is formed to be about 150 μm. Moreover, the depth of the component insertion hole 65 is formed to be about 150 to 200 μm.

Circular alignment holes 268 (optical waveguide layer side alignment recesses) are formed at a plurality of places in the optical waveguide layer main body 262, which penetrate through the top surface and the under surface. The alignment holes 268 are formed to have a diameter of about 0.7 mm corresponding to the size of the guide pins 31. Then, each of the guide pins 231 are fit and supported on each of the alignment holes 268.

FIGS. 32 to 34 depict the optical path switching component 271 used in the embodiment. The optical path switching component 271 is disposed between the optical waveguide layer 261 and the microlens array 281. An optical path switching component main body 272 configuring the optical path switching component 271 is a flat plate member having a top surface and an under surface and made of an optically transparent material (it is PMMA In the embodiment). A projection 273 in a right triangular cross section insertable into the component insertion hole 265 is formed in one piece at almost the center part of the under surface of the optical path switching component main body 272. The shape of the projection 273 seen from the thickness direction of the optical path switching component main body 272 is nearly rectangular, which is formed equal to the shape of the component insertion hole 265 seen from the same direction. A metal film 275 as a light reflector is formed on an inclined plane 274 of the projection 273 at an angle of about 45°. In the embodiment, shiny rhodium is used to form the metal film 275 having a thickness of about 0.1 to 10 μm. This metal film 275 can fully reflect light. The height of the projection 273 is formed to be about 150 to 200 μm nearly equal to the depth of the component insertion hole 265.

Circular alignment holes 278 (optical path switching component side alignment recesses) are formed at four corners of the optical path switching component main body 272, which penetrate through the top surface, and the under surface. The alignment holes 278 are formed to have a diameter of about 0.7 mm corresponding to the size of the guide pins 231. Then, each of the guide pins 231 is fit and supported on each of the alignment holes 278.

Furthermore, FIGS. 32 to 34 depict the microlens array 281 used in the embodiment. The microlens array 281 is disposed between the optical path switching component 271 and the optical interposer 241. A microlens array main body 282 configuring the microlens array 281 is a flat plate member having a top surface and an under surface, and made of an optically transparent material (It is PMMA in the embodiment). Two hemispherical microlenses 283 having a diameter of bout 100 μm are formed in one piece at almost the center part of the top surface of the microlens array main body 282.

Circular alignment holes 288 (microlens side alignment recesses) are formed at four corners of the microlens array main body 282, which penetrate through the top surface and the under surface. The alignment holes 288 are formed to have a diameter of about 0.7 mm corresponding to the size of the guide pins 231. Then, each of the guide pins 231 is fit and supported on each of the alignment holes 288.

Moreover, FIGS. 32 to 34 depict the optical interposers 241 in the embodiment. The optical interposers 241 are disposed on the top surface of the microlens array main body 282. As shown in FIG. 33, the optical interposer 241 is formed of an optical interposer main body 242 of a nearly rectangular plate having a top surface and an under surface. This optical interposer main body 242 is a ceramic circuit board having a cavity on the under surface with via hole conductors 245 and conductor circuits 246. An optical device is mounted in the cavity on the under surface of the optical interposer main body 242 as its face down. More specifically, a VCSEL 251, which is one kind of light emitting device, is mounted on the optical interposer 241 on the emission side, and a photodiode 256, which is one kind of light receiving device, is mounted on the optical interposer 241 on the light receiving side.

The VCSEL 251 is mounted as the emission surface is faced downward, and has a plurality (here, two) of light emitting parts 252 arranged in a row in the light emitting surface. Therefore, the light emitting parts 252 emit a predetermined wavelength of laser beams toward the bottom of FIGS. 32 and 33. The photodiode 256 is mounted as the light receiving surface is faced downward, and has a plurality (here, two) of light receiving parts 257 arranged in a row in the light receiving surface. Therefore, the light receiving parts 257 are configured to easily receive laser beams traveling from the bottom to the top of FIG. 32.

In the meantime, a driver IC 253 is mounted at almost the center part of the top surface of the optical interposer 241 on the emission side as its face up. The driver IC 253 and the VCSEL 251 are conducted to each other through the via hole conductors 245 being high-speed signal transmitting parts. A receiver IC 258 is mounted at almost the center part of the top surface of the optical interposer 241 on the light receiving side as its face up. The receiver IC 258 and the photodiode 256 are conducted to each other through the via hole conductors 245 being the high-speed signal transmitting parts.

As shown in FIGS. 32 and 33, first recesses 244 are disposed at four corners of the optical interposer main body 242. The first recesses 244 are circular in the same cross section, and opened in both of the top surface and the under surface of the optical interposer 241. In the embodiment, the diameter of the first recess 244 is formed to be about 1.0 to 2.0 mm.

A conductive filling product 243 (second recess forming part) is formed in the first recesses 244 by filling a tungsten paste. As shown in FIG. 33, one end of the conductor circuit 246 is connected to this conductive filling product 243. A connecting pad is formed on the other end of the conductor circuit 246, and terminals of the driver IC 253 and the receiver IC 258 are connected on the connecting pad. In the embodiment, since the conductor circuit 246 placed on the left side in FIG. 33 corresponds to the signal layer, it is connected to signal terminals of the driver IC 253 and the receiver IC 258. Since the conductor circuit 246 placed on the right side in FIG. 33 corresponds to the power source layer, it is connected to power source terminals of the driver IC 253 and the receiver IC 258.

In the meantime, an alignment hole 48 serving as a second recess (optical interposer side alignment recess) is disposed at almost the center part of the conductive filling product 243. The alignment hole 248 is circular in the same cross section, and opened in both of the top surface and the under surface of the optical interposer main body 242. In the embodiment, the diameter of the alignment hole 248 is smaller than that of the first recess 244, and formed to be about 0.7 mm. Then, each of the guide pins 231 is fit and supported on each of the alignment holes 248.

The electric circuit board 211 side and the optical interposer 241 side are conducted to each other through the conductive guide pins 231. Therefore, power can be supplied from the electric circuit board 211 side to the optical interposer 241 side. In the meantime, signals can be sent and received between the electric circuit board 211 and the optical interposers 241.

The components are fixed while being aligned sequentially in the following procedures.

First, the guide pins 231 are supported on the electric circuit board 211.

The guide pins 231 are pressed and fit into each of the alignment holes 228 (second recesses) of the electric circuit board 211 with a jig for exclusive use. Then, the guide pins 231 are fit and supported on each of the alignment holes 268 of the optical waveguide layer 261, and the optical waveguide layer 61 is layered on the top surface of the electric circuit board 211. Subsequently, the guide pins 231 are fit and supported on each of the alignment holes 278 of the optical path switching component 271, and the optical path switching component 271 is layered on the top surface of the optical waveguide layer 261. At this is time, a part (the projection 273) of the optical path switching component 271 is inserted into the component insertion hole 265 of the optical waveguide layer 261 as well. Consequently, the metal film 275 formed on the reflection surface 274 of the projection 273 is disposed in the midway of the cores 263, and the optical axes of the metal film 275 and the cores 263 are aligned with each other. Subsequently, the guide pins 231 are fit and supported on each of the alignment holes 288 of the microlens array 281, and the microlens array 281 is layered on the top surface of the optical path switching component 271. Consequently, the optical axes of the cores 263, the metal film 275, and the microlenses 283 are aligned with each other. Lastly, the guide pins 231 are fit and supported on each of the alignment holes 248 of the optical interposer 241, and the optical interposer 241 is layered on the top surface of the microlens array 281. As the result, the optical axes of the cores 263, the metal film 275, the microlenses 283, and the light emitting parts 252 (or the light receiving parts 257) are aligned with each other, and a desired photoelectric composite circuit structure 610 is completed.

[Eighth Embodiment]

Figure 35:
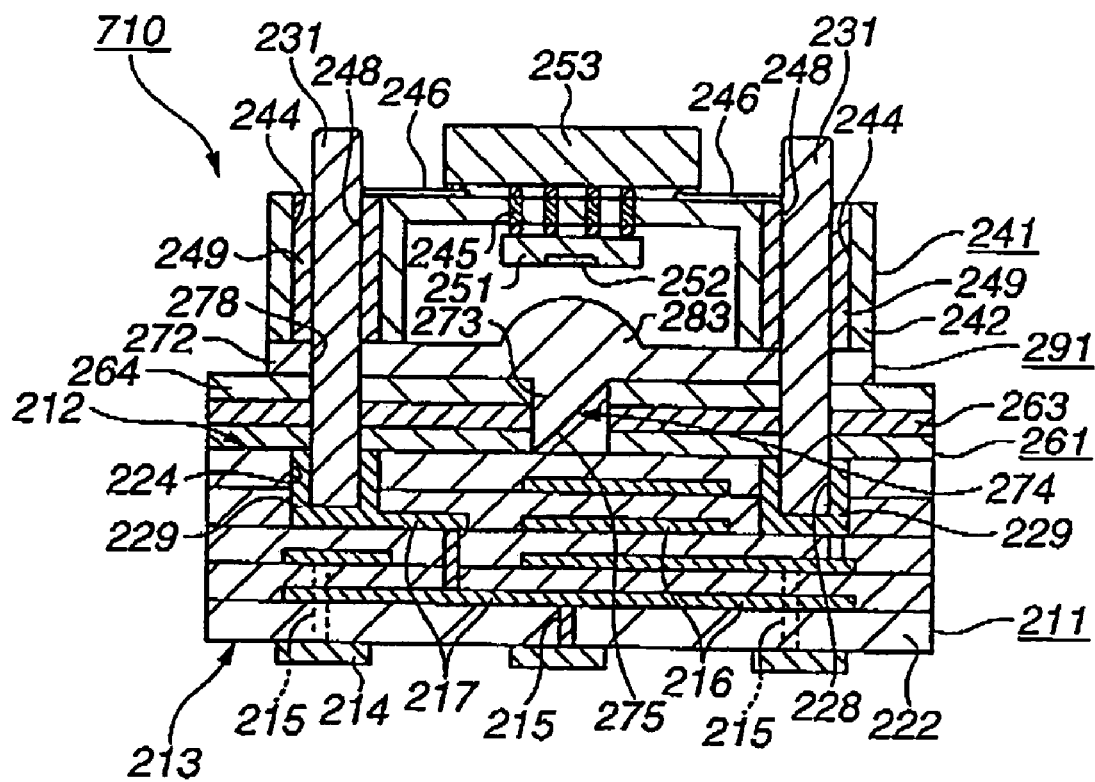
FIG. 35 is a schematic cross-sectional view of a photoelectric composition circuit structure according to an eighth embodiment of the present invention.
Figure 36:
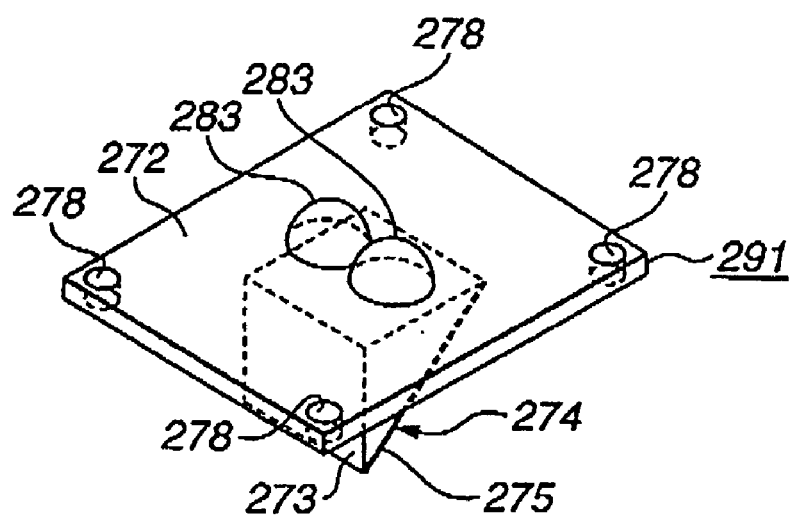
FIG. 36 is a reduced, schematic perspective view of a microlens equipped optical path switching component of the photoelectric composition circuit structure.

Then, a photoelectric composite circuit structure (substrate assembly for supporting an optical component equipped with another optical component) 710 according to an eighth embodiment of the present invention will be described with reference to FIGS. 35 and 36. In the meantime, only the different points from the seventh embodiment will be described, and like parts and portions are designated by like reference characters and will not be described in detail again.

In the seventh embodiment, the optical path switching component 271 and the microlens array 281 are formed as separate components. On the other hand, in this embodiment, a microlens equipped optical path switching component 291 (optical path switching part equipped microlens array) that is a component having the functions of both of them is used. That is, the microlens equipped optical path switching component 291 has a configuration in which the microlenses 283 are formed in one piece on the top surface of the optical path switching component main body 272 of the optical path switching component 271 in the seventh embodiment.

Therefore, according to the configuration, the entire component can be formed thinner by the space of the microlens array main body 282 because it is eliminated. Accordingly, an increase in the distance between the optical waveguide layer 261 and the optical device can be avoided, leading to the reduction in optical transmission loss. Moreover, the configuration can prevent an increase in parts counts.

In the meantime, it is acceptable to modify the above-described embodiments as follows.

(a) Finish machining can be omitted if holes can be formed highly accurately only by precision drilling or other high-precision processing or machining in the second perforating step.

(b) In the first embodiment, the step of mounting the VCSEL 14 and the photodiode 16, which are the optical devices, is conducted after finish machining and before the guide member fitting step. However, it is not limited to this; it will do to conduct the optical device mounting step after the guide member fitting step, or before finish machining.

(c) In the sixth embodiment, the optical waveguides 141 and 151 are used as the optical components having the optical transmission function and the light reflecting function, but instead, it will do to use optical components having the optical transmission function such as an optical fiber connector for configuration. Furthermore, it is acceptable to use optical components having the light condensing function such as a microlens array instead of the optical waveguides 141 and 151.

Figure 8:
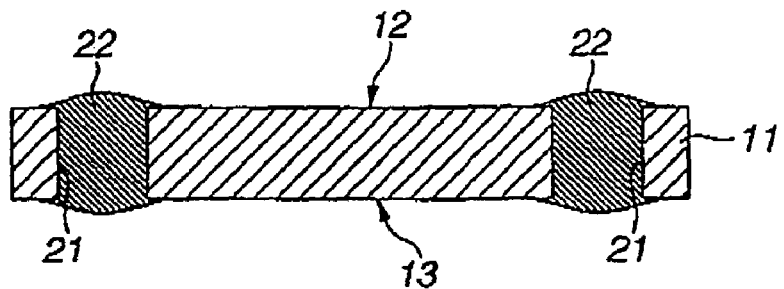
FIG. 8 is a schematic cross-sectional view illustrating a state that a resin material is filled in the ceramic substrate to form a resin layer in the fabrication process of the optical device mounted substrate assembly.

(d) In the first embodiment, as shown in FIGS. 8 to 9, the process steps are conducted in the following order, the step of burying the first recesses with the resin layer 22, the second perforating step of drilling the resin layer 22 to form the second recesses, and the step of surface-polishing and removing the excessive resin layer 22. It will do to change the order. For example, the second perforating step can be conducted before the surface polishing step. Since the flat surface is drilled in this case, the processing accuracy of the second recesses can be improved. Moreover, chipping in the openings of the second recesses is hard to occur as compared with the case where surface polishing is conducted after drilling.

(e) As shown in FIGS. 1 and 14, the optical device mounted substrate assembly (substrate assembly for supporting an optical component) preferably has positioning reference portions 19 at the front surface of the substrate. Preferably, a plurality of alignment recesses is formed with reference to the positioning reference portions 19. According to the configuration, a shift or movement in positioning can be reduced when the optical component is placed with reference to fit pins. Therefore, highly efficient connection can be realized more easily and reliably, and optical transmission loss is further reduced.

In the invention, it is also possible that the plurality of the alignment recesses has the function as the positioning reference portions in mounting of the optical device. The optical component is formed with reference to the alignment recesses, and then a shift or movement in the optical axis from the other optical component is reduced. Furthermore, when the optical device is mounted between the substrate side alignment recesses formed at least in two places, the optical device can be mounted in more improved position accuracy, contributing to reducing a shift in the optical axis.

Moreover, it is acceptable to mount the optical device with reference to the positioning reference portions 19 formed on the substrate. For example, when defects in the optical device are revealed after fitting of the fit pins, it becomes difficult to mount the optical device with reference to the alignment recesses. In this case, the optical device is mounted with reference to the positioning reference portions 19, which allows positioning of the optical device with respect to the substrate side alignment recesses and thereby allows highly accurate positioning of the optical device with respect to the other optical component. In this case, the positioning reference portion 19 is preferably formed between the second recess forming parts formed at least in two places.

More specific examples of the positioning reference portions are a part of a conductor layer formed on the front surface of the supporting substrate (a pad, for example), a mark formed by printing, a via hole conductor appearing on the front surface of the supporting substrate, and the end face of a through hole conductor. Moreover, publicly known techniques can used as techniques of forming the plurality of the alignment recesses with reference to the positioning reference portions. For example, a technique is preferable that uses an image pickup unit such as a CCD camera to take an area including the positioning reference portions and analyzes the image to determine positions to form the plurality of the alignment recesses. The same technique can be used to the case of mounting the optical device with reference to the alignment reference parts.

Next, the technical ideas understood by the embodiments are listed as follows.

(1) A fabrication method of a substrate assembly for supporting an optical component having at least one of an optical transmission function, a light condensing function and a light reflecting function, the substrate assembly including a substrate having a front surface and a first recess having an open end at least at the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical component, the method being characterized by including a first perforating step of forming the first recess in an unsintered ceramic product by machining, a firing step of firing the unsintered ceramic product to form the ceramic substrate, a second recess formed portion forming step of forming the second recess formed portion in a state of being partly cured in the first recess, a second perforating step of forming the second recess in the second recess formed portion by machining after the second recess formed portion forming step, and a curing step of fully curing the second recess formed portion after the second perforating step, a finish step of finish machining the second recess after the full curing step, and a guide member fitting step of fitting the alignment guide member in the second recess after the finishing step.

(2) A substrate assembly for supporting an optical component equipped with another optical component, characterized by including a substrate having a substrate side alignment recess, a first optical component having at least a light reflecting function and having a first optical component side alignment recess, a second optical component disposed between the substrate and the first optical component, having at least a light condensing function and having a second optical component side alignment recess, and an alignment guide member fittingly engageable in the first optical component side alignment recess, the second optical component side alignment recess and the substrate side alignment recess.

(3) A substrate assembly for supporting an optical component equipped with another optical component, characterized by including a ceramic substrate having a front surface and a first recess having an open end at least at the front surface, a first optical component having at least a light reflecting function and having a first optical component side alignment recess, a second optical component disposed between the substrate and the first optical component, having at least a light condensing function and having a second optical component side alignment recess, a second recess formed portion disposed in the first recess and having a second recess smaller in diameter than the first recess and having an open end at least at a side corresponding to the front surface, and an alignment guide member fittingly engageable in the first optical component side alignment recess, the second optical component side alignment recess and the second recess serving as a substrate side alignment recess.

(4) The substrate assembly for supporting an optical component equipped with another optical component according to the technical idea of (2) or (3), characterized in that the first optical component is an optical fiber connector that is connected to an end of an optical fiber and has an optical path switching part.

(5) A fabrication method of a substrate assembly for supporting an optical component having at least one of an optical transmission function, a light condensing function and a light reflecting function, the substrate assembly including a ceramic substrate having a front surface and a first recess having an open end at least at a side corresponding to the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical component, the method being characterized by including a first perforating step of forming the first recess in an unsintered ceramic product by machining, a firing step of firing the unsintered ceramic product to form the ceramic substrate, a second recess formed portion forming step of disposing a spacer member in the first recess, filling an uncured material in the first recess, curing the material and removing the spacer member thereby forming the second recess formed portion having the second recess, and a guide member fitting step of fitting the alignment guide member in the second recess.

(6) A fabrication method of a substrate assembly for supporting an optical component having at least one of an optical transmission function, a light condensing function and a light reflecting function, the substrate assembly including a ceramic substrate having a front surface and a first recess having an open end at least at a side corresponding to the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical component, the method being characterized by including a first perforating step of forming the first recess in an unsintered ceramic product by machining, a firing step of firing the unsintered ceramic product to form the ceramic substrate, a second recess formed portion forming and a guide member mounting step of holding the alignment guide member so that a portion of the alignment guide member is positioned within the first recess, filling an uncured material in the first recess and curing the material thereby forming the second recess formed portion having the second recess and mounting the alignment guide member in the second recess.

(7) A substrate assembly for supporting an optical component according to the technical idea of (1), (5) or (6), characterized in that the substrate is a ceramic substrate, and the second recess formed portion is a resin layer.

(8) A substrate assembly for supporting an optical component according to the technical idea of (7), characterized in that the resin layer contains an inorganic filler having a thermal conductivity higher than a resinous material from which the resin layer is formed.

(9) A substrate assembly for supporting an optical component equipped with an optical waveguide, characterized by including a ceramic substrate having a front surface and a first recess having an open end at least at a side corresponding to the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical waveguide.

(10) A substrate assembly for supporting an optical component equipped with an optical fiber connector, characterized by including a ceramic substrate having a front surface and a first recess having an open end at least at a side corresponding to the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the ceramic substrate and fittingly engageable in an alignment hole of the optical fiber connecter.

(11) A photoelectric composite circuit structure, characterized by including:

an optical device mounted substrate assembly having an optical device mounted substrate formed with an optical device mounted substrate assembly side alignment recess, and an optical device mounted on the optical device mounted substrate and having at least one of a light emitting part and a light receiving part;

an electric circuit board having an electric circuit board main body formed with an electric circuit board side alignment recess, an optical waveguide layer having an optical waveguide layer main body formed with an optical waveguide layer side alignment recess, a core formed in the optical waveguide layer main body, and a cladding formed in the optical waveguide layer main body for surrounding the core;

an optical path switching component made of an optically transparent material, and having an optical path switching component main body formed with an optical path switching component side alignment recess; and an alignment guide member fittingly engageable in the optical device mounted substrate assembly side alignment recess, the electric circuit board side alignment recess, the optical waveguide layer side alignment recess, and the optical path switching component side alignment recess.

(12) The photoelectric composite circuit structure according to the idea of (11), characterized in that the optical path switching component further has a light reflector formed on the optical path switching component main body.

(13) The photoelectric composite, circuit structure according to the idea of (12), characterized by further including a microlens array having a microlens array main body formed with a microlens array side alignment recess, and a microlens made of an optically transparent material and formed on the microlens array main body, wherein the alignment guide member is fittingly engageable in the microlens array side alignment recess.

(14) A structure formed of an optical device mounted substrate assembly, an optical waveguide layer, and an optical path switching component, characterized by including:

the optical device mounted substrate assembly having an optical device mounted substrate assembly main body formed with an optical device mounted substrate assembly side alignment recess, and an optical device mounted on the optical device mounted substrate assembly main body and having at least one of a light emitting part and a light receiving part;

the optical waveguide layer having an optical waveguide layer main body formed with an optical waveguide layer side alignment recess, a core formed in the optical waveguide layer main body, and a cladding formed in the optical waveguide layer main body for surrounding the core;

the optical path switching component made of an optically transparent material and having an optical path switching component main body formed with an optical path switching component side alignment recess; and an alignment guide member fittingly engageable in to the optical device mounted substrate assembly side alignment recess, the optical waveguide layer side alignment recess, and the optical path switching component side alignment recess.

The entire contents of Japanese Patent Applications P2003-045469 (filed Feb. 24, 2003), P2003-185881 (filed Jun. 27, 2003), P2003-313626 (filed Sep. 5, 2003) and P2003-383390 (filed Nov. 13, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A substrate assembly for supporting an optical component having at least one of an optical transmission function, a light condensing function and a light reflecting function, comprising:

a substrate having a front surface and a first recess having an open end at least at the front surface;

a second recess formed portion disposed in the first recess and having a second recess smaller in diameter than the first recess and having an open end at least at a side corresponding to the front surface, the second recess formed portion being made of a material having a machinability better than a material forming the substrate; and an alignment guide member fitted in the second recess and having a protruded portion protruding from the front surface of the substrate and removably engageable in an alignment hole of the optical component.

2. A substrate assembly according to claim 1, wherein the second recess is a high-precision machined hole, and the alignment guide member comprises a guide pin fitted in the high-precision machined hole.

3. A substrate assembly according to claim 2, wherein the substrate is made of a ceramic material, and the second recess formed portion is made of an inorganic material having a machinability better than the ceramic material.

4. A substrate assembly according to claim 1, wherein the substrate comprises at the front surface thereof a positioning reference portion that serves as a reference for positioning of an optical component and for forming the second recess.

5. A substrate assembly according to claim 1, wherein the second recess serves as a reference for positioning of an optical device.

6. A substrate assembly according to claim 1, wherein the substrate comprises two first recesses each having the second recess formed portion formed with the second recess and a positioning reference portion disposed between the second recesses so as to serve as a reference for positioning of the second recesses.

7. A fabrication method of a substrate assembly for supporting an optical component having at least one of an optical transmission function, a light condensing function and a light reflecting function, the substrate assembly comprising a substrate having a front surface and a first recess having an open end at least at the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the substrate and removably engageable in an alignment hole of the optical component, the method comprising:

a first perforating step of forming the first recess in the substrate by machining;

a second recess formed portion forming step of forming the second recess formed portion in the first recess;

a second perforating step of forming the second recess in the second recess formed portion by machining after the second recess formed portion forming step; and a guide member fitting step of fitting the alignment guide member in the second recess.

8. A fabrication method according to claim 7, wherein the second perforating step comprises forming the second recess by high-precision machining.

9. A fabrication method of a substrate assembly for supporting an optical component having at least one of an optical transmission function, a light condensing function and a light reflecting function, the substrate assembly comprising a ceramic substrate having a front surface and a first recess having an open end at least at the front surface, a second recess formed portion disposed in the first recess and having a second recess smaller in diameter than the first recess and having an open end at least at a side corresponding to the front surface, the second recess formed portion being made of a ceramic material having a machinability better than an inorganic material forming the substrate, and an alignment guide member fitted in the second recess and having a protruded portion protruding from the front surface of the ceramic substrate and removably engageable in an alignment hole of the optical component, the method comprising:

a first perforating step of forming the first recess in an unsintered ceramic product by machining;

a firing step of firing the unsintered ceramic product to form the ceramic substrate;

a second recess formed portion forming step of forming the second recess formed portion in the first recess;

a second perforating step of forming the second recess in the second recess formed portion by machining after the second recess formed portion forming step; and a guide member fitting step of fitting the alignment guide member in the second recess.

10. A fabrication method according to claim 9, wherein the first perforating step and the second perforating step comprise forming the first recess and the second recess so that the inner diameter of the first recess after the firing step is larger than the inner diameter of the second recess and the outer diameter of the alignment guide member.

11. A fabrication method according to claim 9, wherein the second perforating step comprises forming the second recess by high-precision machining.

12. A fabrication method of a substrate assembly for supporting an optical component having at least one of an optical transmission function, a light condensing function and a light reflecting function, the substrate assembly comprising a substrate having a front surface and a first recess having an open end at least at the front surface, a second recess formed portion disposed in the first recess and having a second recess smaller in diameter than the first recess and having an open end at least at a side corresponding to the front surface, the second recess formed portion being made of a material having a machinability better than a material forming the substrate, and an alignment guide member fitted in the second recess and having a protruded portion protruding from the front surface of the substrate and removably engageable in an alignment hole of the optical component, the method comprising:

a perforating step of forming the first recess in the substrate by machining; and a second recess formed portion forming and a guide member mounting step of holding the alignment guide member so that a portion of the alignment guide member is positioned within the first recess, filling an uncured material in the first recess and curing the material thereby forming the second recess formed portion having the second recess and fittingly mounting the alignment guide member in the second recess.

13. A substrate assembly according to claim 1, wherein the second recess formed portion comprises a resin.

14. A substrate assembly according to claim 1, wherein the optical component has an optical transmission function.

15. A substrate assembly according to claim 1, wherein the optical component has a light condensing function.

16. A substrate assembly according to claim 1, wherein the optical component has a light reflecting function.

* * * * *